(12) United States Patent
Ogawa et al.

(10) Patent No.: US 8,777,417 B2
(45) Date of Patent: Jul. 15, 2014

(54) HIGH-PRESSURE DISCHARGE LAMP, LAMP UNIT, AND PROJECTOR-TYPE IMAGE DISPLAY APPARATUS

(75) Inventors: Hiroki Ogawa, Osaka (JP); Jun Sakaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 13/519,998

(22) PCT Filed: Dec. 2, 2011

(86) PCT No.: PCT/JP2011/006779
§ 371 (c)(1),
(2), (4) Date: Jun. 29, 2012

(87) PCT Pub. No.: WO2012/077323
PCT Pub. Date: Jun. 14, 2012

(65) Prior Publication Data
US 2012/0287409 A1    Nov. 15, 2012

(30) Foreign Application Priority Data
Dec. 8, 2010 (JP) .................... 2010-273156

(51) Int. Cl.
*G03B 21/00*  (2006.01)
*H01J 61/30*  (2006.01)
*G03B 21/20*  (2006.01)

(52) U.S. Cl.
CPC ............. *G03B 21/2006* (2013.01); *H01J 61/30* (2013.01)
USPC .............. 353/31; 353/122; 313/571; 313/634

(58) Field of Classification Search
CPC ............... G03B 21/20; G03B 21/2006; G03B 21/2026; G03B 21/2066; G03B 21/2093; G03B 21/28; F21V 7/00; F21V 7/005; F21V 7/0058; F21V 7/04; F21V 7/22; H01J 61/00; H01J 61/20; H01J 61/30; H01J 61/82; H01J 61/822; H01J 61/54
USPC ........... 353/30–31, 34, 37, 49–50, 81, 85–86, 353/98–99, 122; 362/210, 217.01–217.02, 362/217.05–217.07, 235, 241, 244–245, 362/247, 257, 296.01–296.1, 310; 313/567, 313/570–571, 634, 639–642
See application file for complete search history.

(56) References Cited

U.S. PATENT DOCUMENTS 5,497,049 A     3/1996  Fischer
5,608,227 A *   3/1997  Dierks et al. ............... 250/492.1
6,084,351 A *   7/2000  Kai et al. ....................... 313/634

(Continued)

FOREIGN PATENT DOCUMENTS

JP          6-52830       2/1994
JP          2001-283782   10/2001

(Continued)

*Primary Examiner* — Tony Ko
*Assistant Examiner* — Jori S Reilly-Diakun
(74) *Attorney, Agent, or Firm* — Greenblum & Bernstein, P.L.C.

(57) ABSTRACT

A high-pressure discharge lamp comprising an arc tube, the arc tube including: a light-emitting part which is substantially ellipsoidal; and sealing parts which extend from either end of the light-emitting part and in which bases of electrodes are sealed, the arc tube enclosing 0.2 mg/mm³ to 0.4 mg/mm³ of mercury, the high-pressure discharge lamp having a power rating greater than 355 W and not greater than 600 W, wherein $5.4 \leq D \leq 5.8$ and $3.1 \leq X \leq D-2.3$ when $355 < P \leq 380$, $5.8 \leq D \leq 6.2$ and $3.1 \leq X \leq D-2.7$ when $380 < P \leq 450$, and $6.2 \leq D \leq 6.6$ and $3.1 \leq X \leq D-3.3$ when $450 < P \leq 600$, where P denotes the power rating in watts of the high-pressure discharge lamp, D denotes an inside diameter in millimeters of the light-emitting part 104 with reference to a midpoint between the electrodes 101, and X denotes a wall thickness in millimeters of the light-emitting part 104 with reference to the midpoint between the electrodes 101.

3 Claims, 20 Drawing Sheets

(56) References Cited

U.S. PATENT DOCUMENTS

| | | | |
|---|---|---|---|
| 6,232,720 B1 * | 5/2001 | Kitahara et al. | 313/634 |
| 6,483,239 B1 * | 11/2002 | Kabuki et al. | 313/620 |
| 6,575,599 B1 * | 6/2003 | Imamura et al. | 362/294 |
| 6,597,115 B2 * | 7/2003 | Goto et al. | 313/631 |
| 6,653,786 B2 | 11/2003 | Fukushima et al. | |
| 7,176,630 B2 * | 2/2007 | Hendrix et al. | 313/623 |
| 8,198,816 B2 * | 6/2012 | Imamura et al. | 313/631 |
| 8,674,591 B2 * | 3/2014 | Kessels et al. | 313/26 |
| 2004/0189209 A1 | 9/2004 | Kai et al. | |
| 2006/0035558 A1 | 2/2006 | Hataoka et al. | |
| 2007/0052365 A1 | 3/2007 | Sakaguchi et al. | |
| 2013/0335715 A1 * | 12/2013 | Sakaguchi et al. | 353/98 |

FOREIGN PATENT DOCUMENTS

| | | |
|---|---|---|
| JP | 2002-352768 | 12/2002 |
| JP | 2006-269394 | 10/2006 |
| JP | 2011-228037 | 11/2011 |
| WO | 03/100822 | 12/2003 |
| WO | 2004/084253 | 9/2004 |

* cited by examiner

FIG. 16

|  | Inside diameter [mm] | Wall thickness [mm] |
|---|---|---|
| Sample 11 | 5 | 3.1 |
| Sample 12 | 5 | 3.5 |
| Sample 14 | 5.4 | 3.5 |
| Sample 16 | 5.8 | 3.1 |
| Sample 17 | 5.8 | 3.5 |
| Sample 18 | 5.8 | 3.3 |
| Sample 19 | 6.2 | 3.5 |
| Sample 20 | 5.8 | 3.1 |
| Sample 21 | 5.8 | 3.3 |
| Sample 22 | 6.2 | 3.3 |
| Sample 23 | 6.2 | 3.1 |
| Sample 24 | 6.2 | 3.3 |
| Sample 25 | 6.6 | 3.3 |
| Sample 26 | 6.2 | 3.1 |
| Sample 27 | 6.2 | 3.3 |
| Sample 28 | 6.6 | 3.3 |

HIGH-PRESSURE DISCHARGE LAMP, LAMP UNIT, AND PROJECTOR-TYPE IMAGE DISPLAY APPARATUS

TECHNICAL FIELD

The present invention relates to a high-pressure discharge lamp, a lamp unit, and a projector-type image display apparatus.

BACKGROUND ART

One example of conventional high-pressure discharge lamps is a high-pressure mercury-vapor discharge lamp composed of: an arc tube, which is made of quartz glass for example and which has a light-emitting part containing a substantially ellipsoidal inner space; a gas, which is enclosed within the inner space of the light-emitting part and which includes at least mercury and a rare gas; and at least two electrodes, which are arranged in the inner space of the light-emitting part so as to face each other, wherein the lamp satisfies $W \geq 150$, $P \geq 250$, $t \leq 5$, and $rl \leq 0.0103 \times W - 0.00562 \times P - 0.316 \times rs + 0.615 \times t + 1.93$, where W (watts) is the power of the lamp during its lighting operation, P (atm) is an operating pressure in the inner space of the light-emitting part, rs (mm) is the shorter radius of the inner space (i.e. the shorter inner radius of the light-emitting part), rl (mm) is the longer radius of the inner space (i.e. the longer inner radius of the light-emitting part) (where $rl \geq rs$), and t (mm) is the wall thickness of the light-emitting part (see Patent Literature 1, for example).

In regard to the high-pressure mercury lamp disclosed in Patent Literature 1, the lamp power W (watts), the operating pressure P (atm), the shorter radius rs (mm) of the inner space of the light-emitting part, the longer radius rl (mm) of the inner space of the light-emitting part, and the wall thickness t (mm) of the light-emitting part satisfy a predetermined relationship when W (watts) is equal to or greater than 200. It is disclosed that when this relationship is satisfied, the stress on the inner surface of the light-emitting part is suppressed to be equal to or less than 5 $N/mm^2$, which prevents breakage of the light-emitting part.

CITATION LIST

Patent Literature

[Patent Literature 1] WO No. 03/100822

SUMMARY OF INVENTION

Technical Problem

In recent years, markets of high-power projectors used for large screens and movie theaters have been developed. Consequently, lamps for such projectors are demanded to have higher intensity and longer life than conventional high-pressure discharge lamps. That is, there are needs for lamps with a power rating greater than 355 W.

The inventors of the present invention manufactured a lamp with a power rating greater than 355 W according to the disclosure of Patent Literature 1. However, they found that the arc tube of such a lamp loses transparency at an early stage. This can be because the arc tube disclosed in Patent Literature 1 was designed considering only prevention of breakage of the arc tube, based on the results of tests and simulations conducted under the condition in which the upper limit is 310 W. In other words, in Patent Literature 1, stress affecting the arc tube is the only factor considered in the simulations, and loss of transparency of the arc tube is not taken into consideration.

The inventors of the present invention attempted to prevent loss of transparency of the arc tube from occurring at an early stage by finding that loss of transparency is likely to occur due to the temperature of a particular part of the arc tube during lighting. Meanwhile, it was difficult to assure a long life of a high-pressure discharge lamp, because higher power leads to a higher temperature of the internal space of the arc tube.

In view of the above, a high-pressure discharge lamp pertaining to the present invention aims to prevent both breakage and loss of transparency of a light-emitting part of its arc tube.

A lamp unit and a projector-type image display apparatus pertaining to the present invention aim to improve the reliability with respect to their life-spans, by using a high-pressure discharge lamp that prevents breakage and loss of transparency of a light-emitting part included in an arc tube of the lamp from occurring at an early stage.

Solution to Problem

To solve the problem above, a high-pressure discharge lamp pertaining to the present invention is a high-pressure discharge lamp comprising an arc tube, the arc tube including: a light-emitting part which is substantially ellipsoidal, which encloses a predetermined amount of mercury, and in which a pair of electrodes are disposed so that heads of the electrodes face each other; and sealing parts which extend from either end of the light-emitting part and in which bases of the electrodes are sealed, the high-pressure discharge lamp having a power rating greater than 355 W and not greater than 600 W, the predetermined amount falling within a range of 0.2 $mg/mm^3$ to 0.4 $mg/mm^3$, wherein $5.4 \leq D \leq 5.8$ and $3.1 \leq X \leq D-2.3$ when $355 < P \leq 380$, $5.8 \leq D \leq 6.2$ and $3.1 \leq X \leq D-2.7$ when $380 < P \leq 450$, and $6.2 \leq D \leq 6.6$ and $3.1 \leq X \leq D-3.3$ when $450 < P \leq 600$, where P denotes the power rating in watts of the high-pressure discharge lamp, D denotes an inside diameter in millimeters of the light-emitting part with reference to a midpoint between the electrodes, and X denotes a wall thickness in millimeters of the light-emitting part with reference to the midpoint between the electrodes.

Here, the term "substantially ellipsoidal" may refer to a spherical shape as well as an ellipsoidal shape.

A lamp unit pertaining to the present invention is a lamp unit comprising: the high-pressure discharge lamp as defined above; and a reflection mirror which has a concave reflection surface and in which the high-pressure discharge lamp is disposed so that light emitted by the high-pressure discharge lamp is reflected by the concave reflection surface.

A projector-type image display apparatus pertaining to the present invention is a projector-type image display apparatus comprising: the lamp unit as defined above; an optical unit configured to modulate light emitted by the lamp unit and to thereby form an optical image; and a projector device configured to magnify and project the optical image.

Advantageous Effects of Invention

A high-pressure discharge lamp pertaining to the present invention prevents breakage and loss of transparency of a light-emitting part of an arc tube from occurring at an early stage.

Also, a lamp unit and projector-type image display apparatus pertaining to the present invention improve the reliability in regards to their life-spans, by using a high-pressure discharge lamp that prevents breakage and loss of transparency of a light-emitting part of an arc tube from occurring at an early stage.

BRIEF DESCRIPTION OF DRAWINGS

FIG. 16 shows specifications of lamps used in Test 3.

DESCRIPTION OF EMBODIMENTS

Embodiment 1

Figure 1:
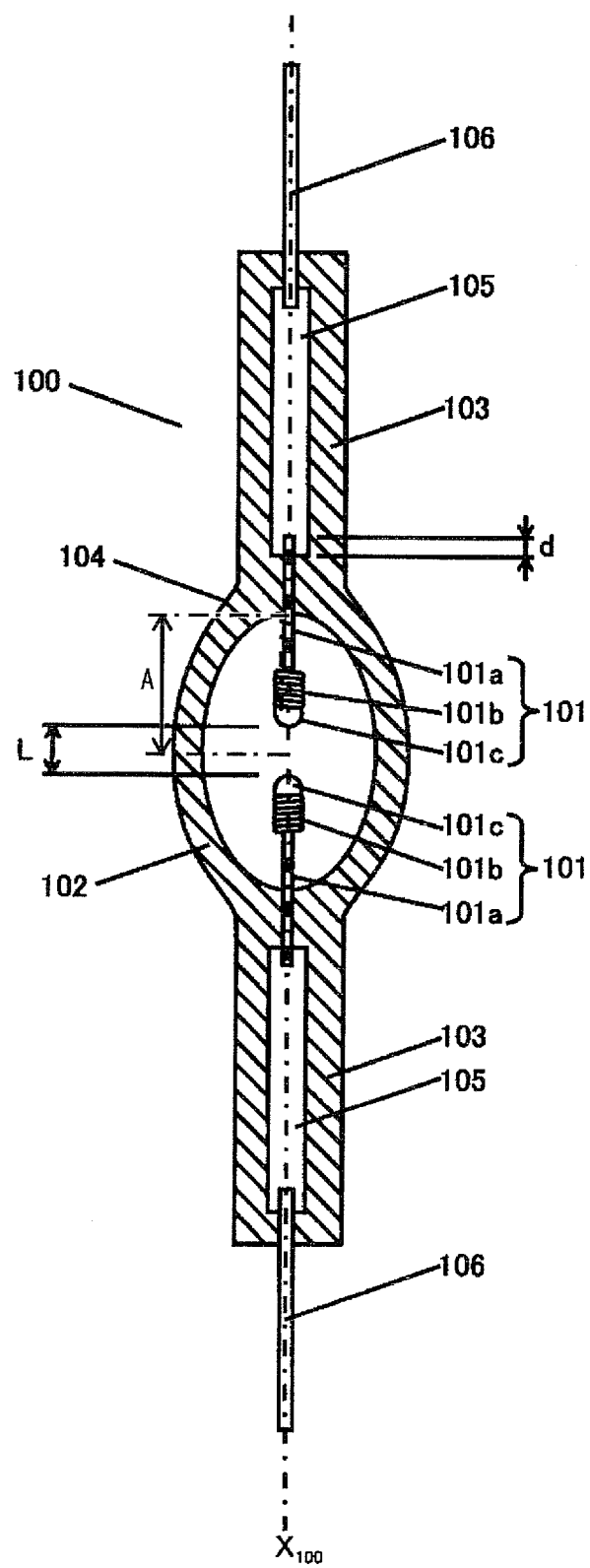
FIG. 1 is a cross-sectional view of a high-pressure discharge lamp pertaining to Embodiment 1 of the present invention, including a tube axis of the lamp.

FIG. 1 is a cross-sectional view of a high-pressure discharge lamp pertaining to Embodiment 1 of the present invention, including a tube axis $X_{100}$ of the lamp. The high-pressure discharge lamp (hereinafter referred to as "lamp 100") pertaining to Embodiment 1 of the present invention includes an arc tube 104. The arc tube 104 includes: a light-emitting part 102, which is substantially spherically-shaped and encloses mercury, and in which a pair of electrodes are disposed so that their respective heads face each other; and sealing parts 103, which extend from the ends of the light-emitting part 102 and in which bases of electrodes 101 are sealed. Note in FIG. 1 that the electrodes 101, and later-described metal foils 105 and lead wires 106 are depicted without being cut, for the sake of convenience.

The light-emitting part 102 is a part in which a discharge space is formed. The light-emitting part 102 is made of silica glass, which is light-transmissive material, and is substantially ellipsoidal, and has a discharge space therein. There are no restriction on the outside diameter and the inside diameter of the light-emitting part 102 and the volume of the discharge space, for example. They may be variously designed according to needs, within the scope of technical concept of the present invention.

The light-emitting part 102 encloses mercury (Hg) as a light-emitting substance, a rare gas as an aid in starting discharge, and a halogen substance, each in a predetermined amount.

When the internal volume of the light-emitting part 102 is approximately in the range from 0.1 cm$^3$ to 0.2 cm$^3$, approximately 0.3 mg/mm$^3$ of mercury as a light-emitting substance, approximately 30 kPa of rare gas as an aid in starting discharge, and approximately $10^{-7}$ μmol/mm$^3$ to $10^{-2}$ μmol/mm$^3$ of bromine are enclosed in the light-emitting part 102, for example.

The rare gas is, for example, either argon (Ar), krypton (Kr) or xenon (Xe), or a mixture of at least two of them. The halogen substance is, for example, either iodine (I), bromine (Br), or chlorine (Cl), or a mixture of at least two of them.

The amount of enclosed mercury is at least 0.1 mg/mm$^3$, but not greater than 0.35 mg/mm$^3$. For example, 0.25 mg/mm$^3$ of mercury is enclosed. When the rare gas is an argon gas, its amount is within the range from 0.01 MPa to 1 MPa (at 25° C.). For example, 0.3 MPa of argon gas is enclosed. When the halogen substance is bromine, its amount is within the range from $1 \times 10^{-10}$ mol/cm$^3$ to $1 \times 10^{4}$ mol/cm$^3$. For example, $5 \times 10^{-5}$ mol/cm$^3$ of bromine is enclosed.

Note that the amounts of mercury, rare gas and halogen substance enclosed in the light-emitting part 102 may be changed according to needs.

Within the light-emitting part 102, a pair of electrodes 101 made of tungsten (W) are disposed so that their respective heads face each other. In other words, the central axes of the electrodes 101 in the longitudinal direction (which are substantially the same as the central axis of the arc tube 104 in the longitudinal direction) coincide with each other.

Each of the electrodes 101 includes an electrode rod 101$a$ and an electrode coil 101$b$ attached to one end of the electrode rod 101$a$. A head 101$c$ (i.e. one end) of each of the electrodes 101 has been processed to be substantially semispherical, spherical, or conical for example, by fusing both a portion of the electrode rod 101$a$ and a portion of the electrode coil 101$b$. The head 101$c$ of each of the electrodes 101 has a protrusion (not depicted) naturally formed through halogen cycles during lighting. That is, tungsten, which is a constitutional material of the electrodes 101, evaporates during lighting, and is deposited again particularly at the tips of the heads 101$c$ of the electrodes 101, and this forms the protrusions. The protrusions discussed here occur during an aging process, which is one of processes for manufacturing products. Hence, the protrusions have already been formed at completion of products. A distance L between the electrodes 101 specifically is a distance between these protrusions 9. The distance L between the electrodes 101 (see FIG. 1) is set within the range from 0.5 mm to 2.0 mm. For example, L is 1.2 mm.

To shape the head 101c of each of the electrodes 101 to be substantially semispherical, spherical or conical, it is possible to attach parts that have been cut or baked to be substantially semispherical, spherical, or conical to the heads of the electrode rods 101a, instead of fusing a portion of the electrode rod 101a and a portion of the electrode coil 101b.

Note that the electrode rods 101a and the electrode coils 101b may be made of high-purity tungsten in which the total amount of secondary constitutional elements, namely Al, Ca, Cr, Cu, Fe, Mg, Mn, Ni, Si, Sn, Na, K, Mo, U and Th, is 10 ppm or less. When the electrodes 101 are made of such a high-purity tungsten material and such electrodes are used in a high-pressure discharge lamp, blackening of the arc tube 104 is suppressed during the lamp life. This is effective for improvement of the lumen maintenance factor.

The surfaces of the electrode rods 101a may have been subject to etching. This reduces distortion of the sealing parts 103 in which the bases of the electrodes 101 are sealed.

The lamp 100 satisfies the conditions represented by the following relational expressions (hereinafter referred to as "Relational Expressions 1):
 $5.4 \leq D \leq 5.8$ and $3.1 \leq X \leq D-2.3$ when $355 < P \leq 380$;
 $5.8 \leq D \leq 6.2$ and $3.1 \leq X \leq D-2.7$ when $380 < P \leq 450$; and
 $6.2 \leq D \leq 6.6$ and $3.1 \leq X \leq D-3.3$ when $450 < P \leq 600$,
where P denotes the power rating (in W), D denotes the inside diameter (in mm) of the arc tube with reference to the midpoint between the pair of electrodes, and X denotes the wall thickness (in mm) of the arc tube with reference to the midpoint between the pair of electrodes.

Relational Expression 1 prevents breakage and loss of transparency of the light-emitting part 102 of the arc tube 104 from occurring at an early stage.

The distal ends of the electrodes 101 are connected to the proximal ends of the lead wires 106 via the metal foils 105. The metal foils 105 are made of molybdenum and are hermetically sealed to the sealing parts 103. The distal ends of the lead wires 106 externally protrude from the end faces of the sealing parts 103, and are connected to power supply lines or bases or the like, which are not depicted.

In FIG. 1, the arc tube 104 which has not been attached with other parts such as bases is regarded as a high-pressure discharge lamp. However, the term "high-pressure discharge lamp" may refer to the arc tube 104 to which accessories such as bases have been attached.

Test 1

In order to confirm that loss of transparency of the light-emitting part 102 of the arc tube 104 can be prevented from occurring at an early stage when Relational Expressions 1 is satisfied, the inventors of the present invention conducted a simulation test. The following describes an example of the simulation test.

In the simulation test, the temperature of the arc tube during lighting was measured under the condition that the lamp is cooled so that the temperature at a point on the external surface of the arc tube is 860° C. The point corresponds in position to the midpoint between the pair of electrodes. The temperature of the arc tube was measured at the following points: a point on the internal surface of the arc tube. which corresponds in position to the midpoint between the pair of electrodes (This point is hereinafter referred to as "Measurement Point 1"); a point that is 1 mm away from Measurement Point 1 in a direction toward the external surface of the light-emitting part of the arc tube (i.e. in a direction perpendicular to the tube axis $X_{100}$ of the lamp 100. The same applies to the following) (This point is hereinafter referred to as "Measurement Point 2"); a point that is 2 mm away from Measurement Point 1 in the direction toward the external surface of the light-emitting part of the arc tube (This point is hereinafter referred to as "Measurement Point 3"); a point that is 2.7 mm away from Measurement Point 1 in the direction toward the external surface of the light-emitting part of the arc tube (This point is hereinafter referred to as "Measurement Point 4"); a point that is 3.1 mm away from Measurement Point 1 in the direction toward the external surface of the light-emitting part of the arc tube (This point is hereinafter referred to as "Measurement Point 5"); and a point that is 3.5 mm away from Measurement Point 1 in the direction toward the external surface of the light-emitting part of the arc tube (This point is hereinafter referred to as "Measurement Point 6").

Lamp samples were lit under the condition that the tube axis is substantially horizontal. The measurement point for each sample was determined on the upper side in the substantially vertical direction, since the temperature on this side is likely to be raised.

The following describes the samples.

Sample 1 is a lamp with the following characteristics: the power rating is 360 W; the inside diameter of the light-emitting part with reference to the midpoint between the pair of electrodes is 5.0 mm; and the wall thickness of the light-emitting part with reference to the midpoint between the pair of electrodes (i.e. the wall thickness of the intersection of the wall of the light-emitting part with an imaginary plane that passes through the midpoint and is perpendicular to the tube axis $X_{100}$. The same applies to the following) is 2.7 mm. Sample 2 is substantially the same as Sample 1 except that the wall thickness of the light-emitting part with reference to the midpoint between the pair of electrodes is 3.1 mm. Sample 3 is substantially the same as Sample 1 except that the wall thickness of the light-emitting part with reference to the midpoint between the pair of electrodes is 3.5 mm. Sample 4 is substantially the same as Sample 1 except that the inside diameter of the light-emitting part with reference to the midpoint between the pair of electrodes is 5.4 mm. Sample 5 is substantially the same as Sample 2 except that the inside diameter of the light-emitting part with reference to the midpoint between the pair of electrodes is 5.4 mm. Sample 6 is substantially the same as Sample 3 except that the inside diameter of the light-emitting part with reference to the midpoint between the pair of electrodes is 5.4 mm. Sample 7 is substantially the same as Sample 1 except that the inside diameter of the light-emitting part with reference to the midpoint between the pair of electrodes is 5.8 mm. Sample 8 is substantially the same as Sample 2 except that the inside diameter of the light-emitting part with reference to the midpoint between the pair of electrodes is 5.8 mm. Sample 9 is substantially the same as Sample 3 except that the inside diameter of the light-emitting part with reference to the midpoint between the pair of electrodes is 5.8 mm.

As for Samples 1, 4 and 7, the temperature was measured only at Measurement Points 1 through 4, because the wall thickness of the light-emitting part with reference to the midpoint between the pair of electrodes is 2.7 mm. Similarly, as for Samples 2, 5 and 8, the temperature was measured only at Measurement Points 1 through 5, because the wall thickness of the light-emitting part with reference to the midpoint between the pair of electrodes is 3.1 mm.

Figure 2:
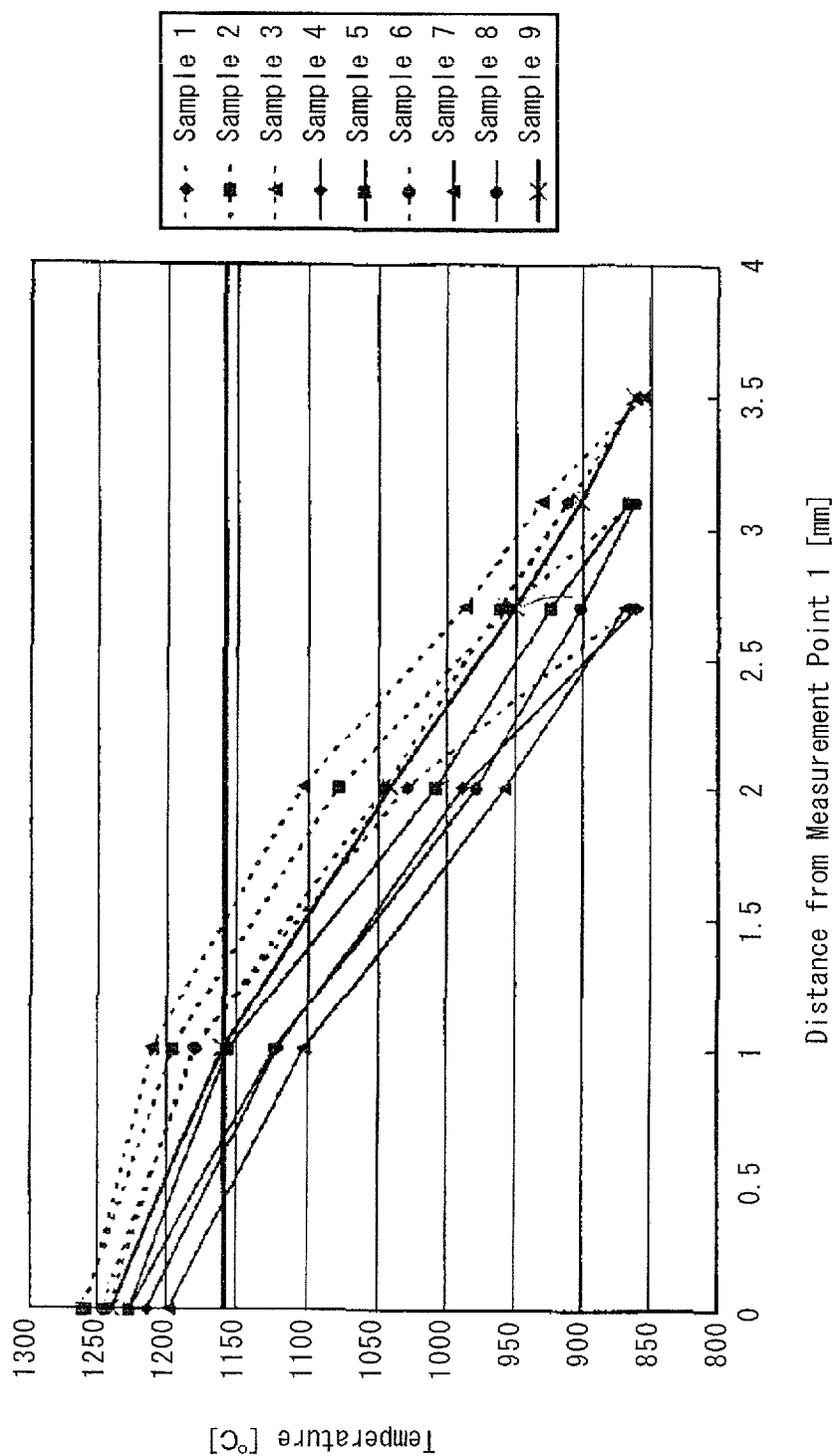
FIG. 2 shows relationships between a distance from a measurement point 1 and a temperature at the point.

FIG. 2 shows the results. In FIG. 2, the dashed lines correspond to samples in which loss of transparency occurred, and the solid lines correspond to samples in which loss of transparency did not occur. When the distance from the Measurement Point 1 is 2 mm, 2.7 mm and 3.1 mm, the temperatures at which loss of transparency occurred are not orderly (i.e. there is no threshold for determining whether loss of transparency occurred or not). In contrast, when the distance from Measurement Point 1 is 1 mm (i.e. Measurement Point 2), the border between whether loss of transparency occurred or not is 1160° C.

That is, in FIG. 2, the solid lines correspond to the samples with which the temperature at Measurement Point 2 (1 mm away from Measurement Point 1) was not higher than 1160° C., and the dashed lines correspond to the samples with which the temperature at Measurement Point 2 was higher than 1160° C.

As described above, the temperature at Measurement Point 2 is higher than 1160° C. in Samples 1, 2, 3 and 6, and the temperature at Measurement Point 2 is not higher than 1160° C. in Samples 4, 5, 7, 8 and 9.

Figure 3:
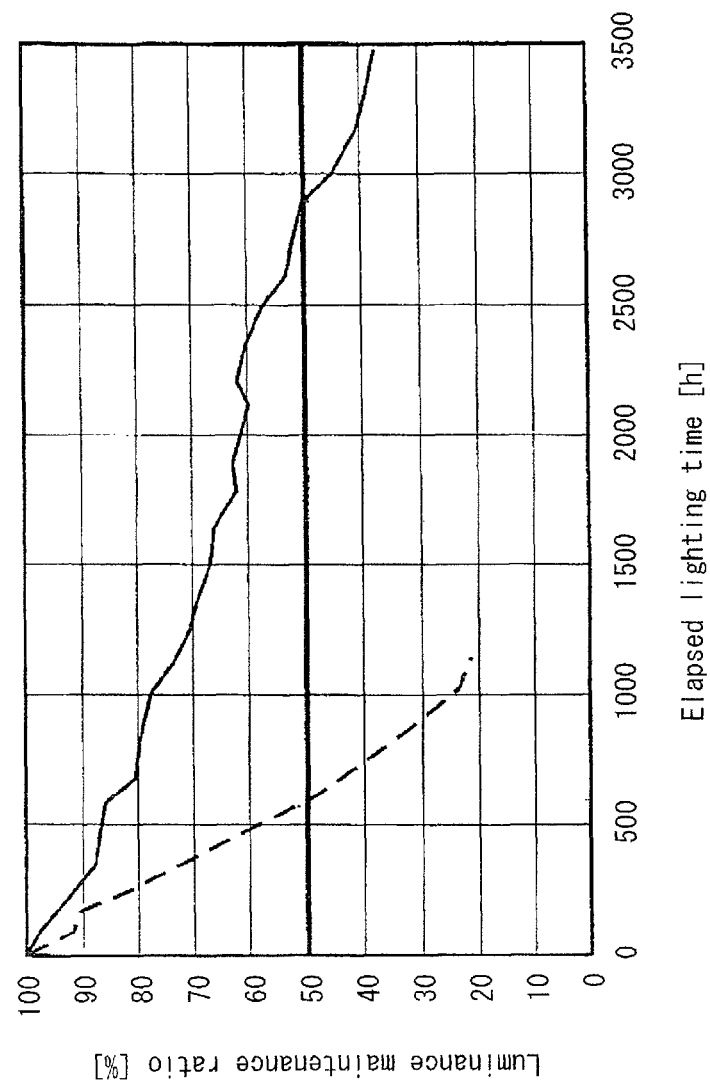
FIG. 3 shows relationships between elapsed lighting time and a luminance maintenance ratio.

Furthermore, in order to examine the relationship between the results of the simulation test as to the temperature of the light-emitting part of the arc tube and loss of transparency of the light-emitting part, the inventors measured a luminance maintenance ratio for each of the samples. As a result, the inventors found that the temperature at Measurement Point 2 affects the luminance maintenance ratio. FIG. 3 shows the luminance maintenance ratio of Samples 5 and 6 as representative examples. In FIG. 3, the solid line corresponds to Sample 5, and the dashed line corresponds to Sample 6.

As shown in FIG. 3, the luminance maintenance ratio of Sample 5 becomes 50% at 2900 h, whereas the luminance maintenance ratio of Sample 6 becomes 50% at 570 h. This is because the light-emitting part of the arc tube of Sample 6 lost its transparency earlier than Sample 5. Since an arc tube without transparency blocks light, the luminance maintenance ratio of Sample 6 decreased earlier.

The temperature at Measurement Point 2 of Sample 5 is not higher than 1160° C., and the temperature at Measurement Point 2 of Sample 6 is higher than 1160° C.

The inventors checked the luminance maintenance ratio for each of the other samples, and obtained similar results as to the relationship between the luminance maintenance ratio and the temperature at Measurement Point 2.

Thus, the inventors found that loss of transparency of the light-emitting part of the arc tube is prevented from occurring at an early stage in Samples 4, 5, 7, 8 and 9.

Figure 4:
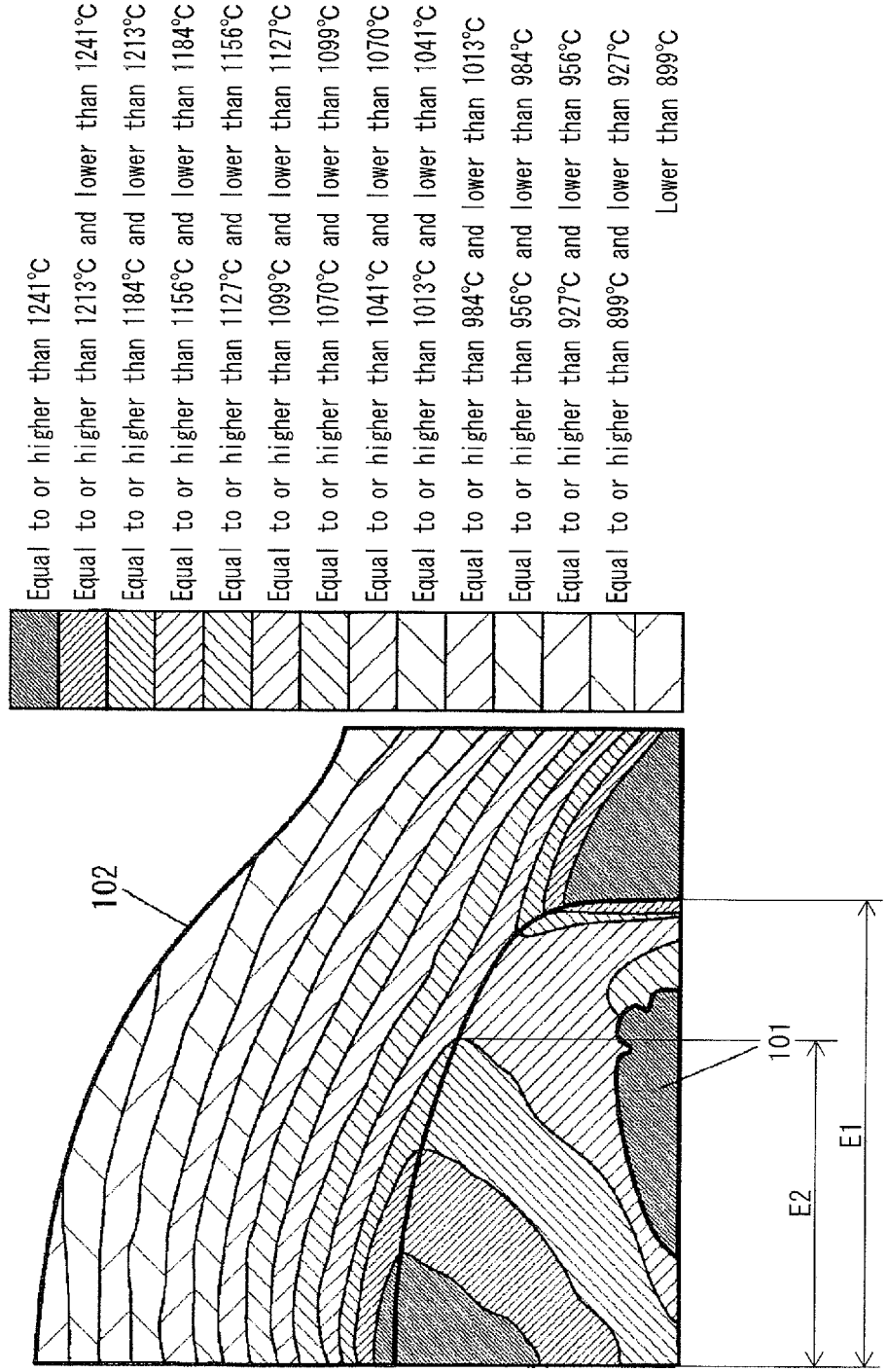
FIG. 4 shows temperature distribution of light-emitting part of an arc tube of Sample 1.
Figure 5:
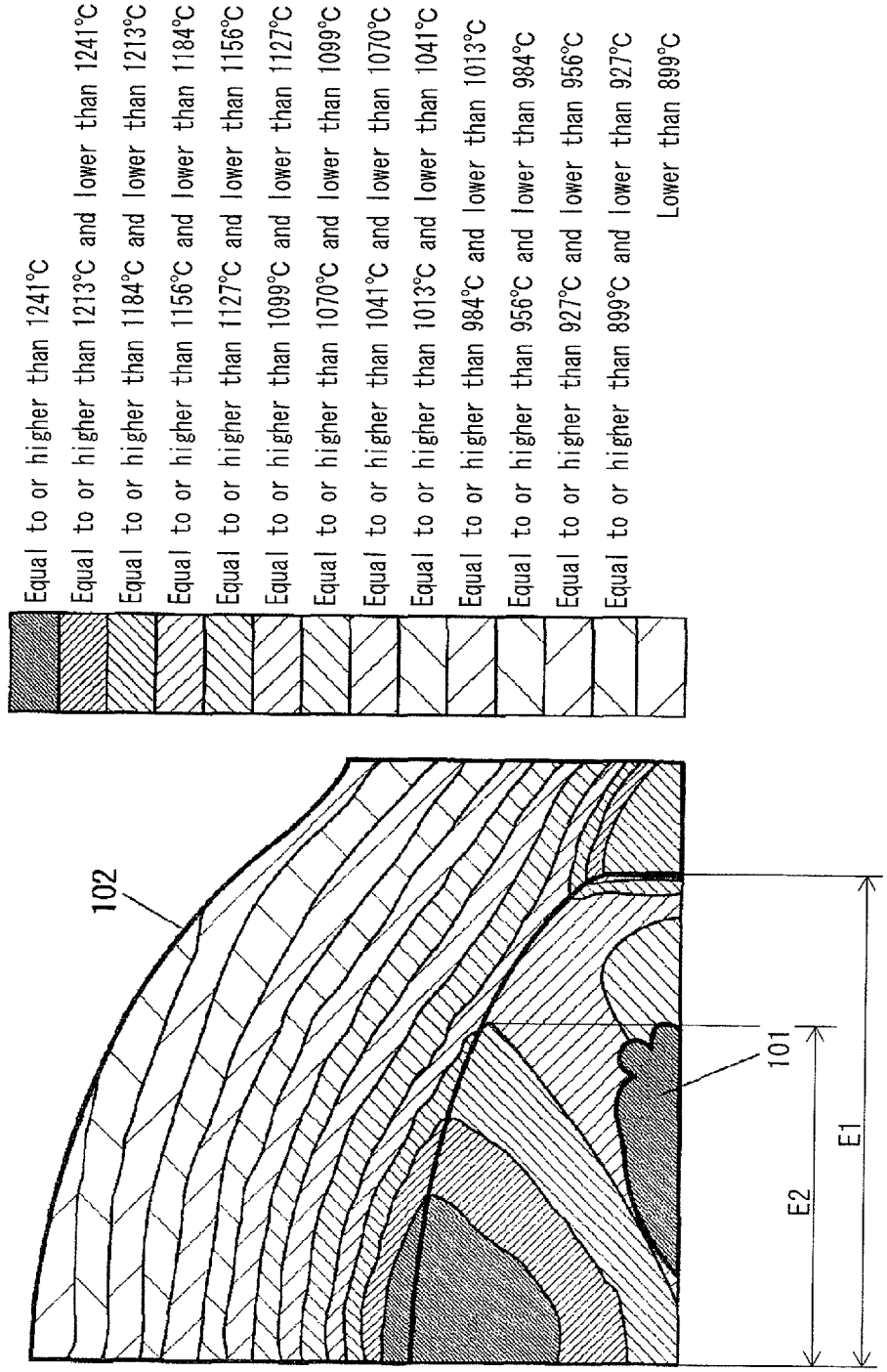
FIG. 5 shows temperature distribution of light-emitting part of an arc tube of Sample 2.
Figure 6:
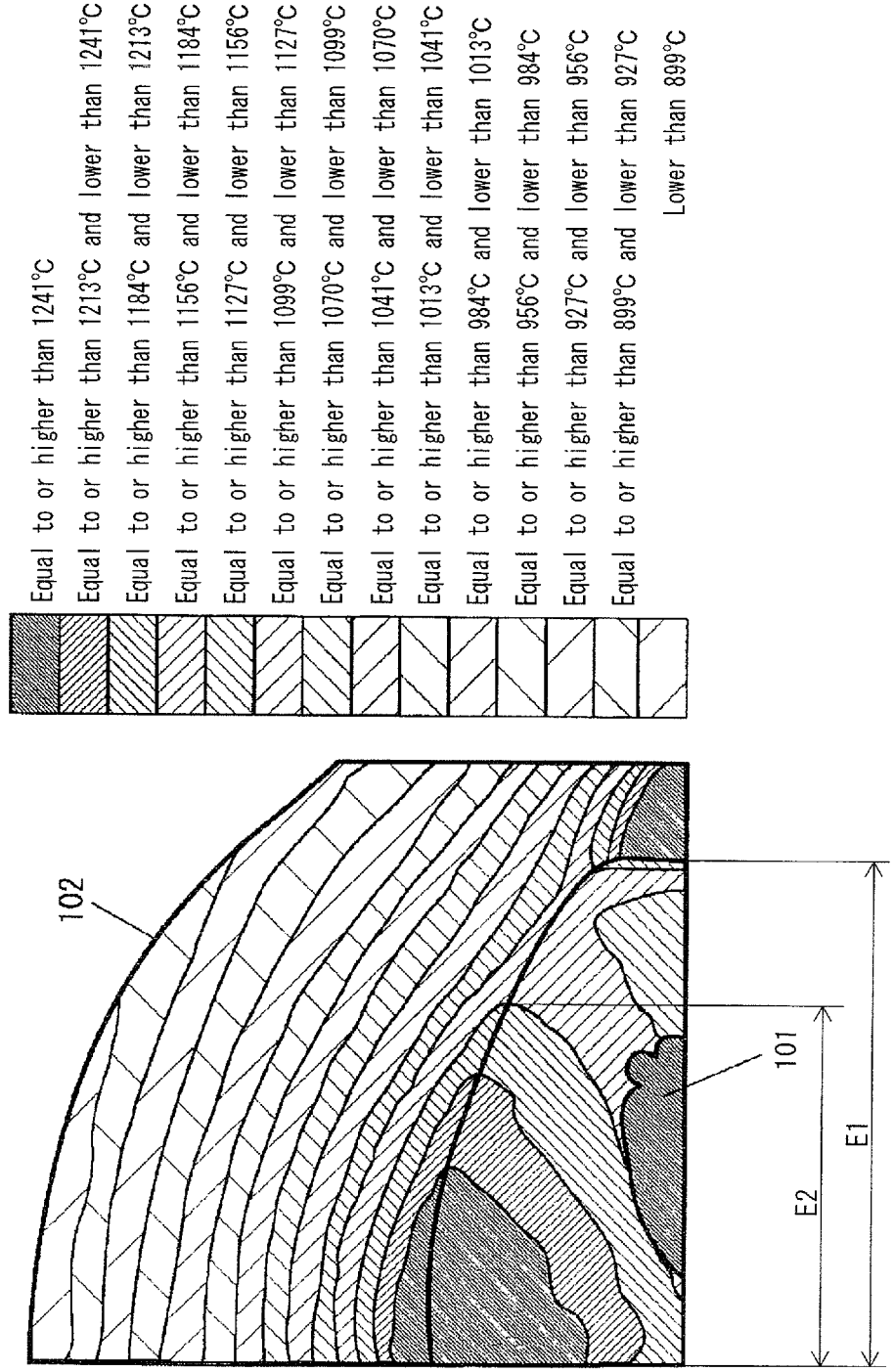
FIG. 6 shows temperature distribution of light-emitting part of an arc tube of Sample 3.
Figure 7:
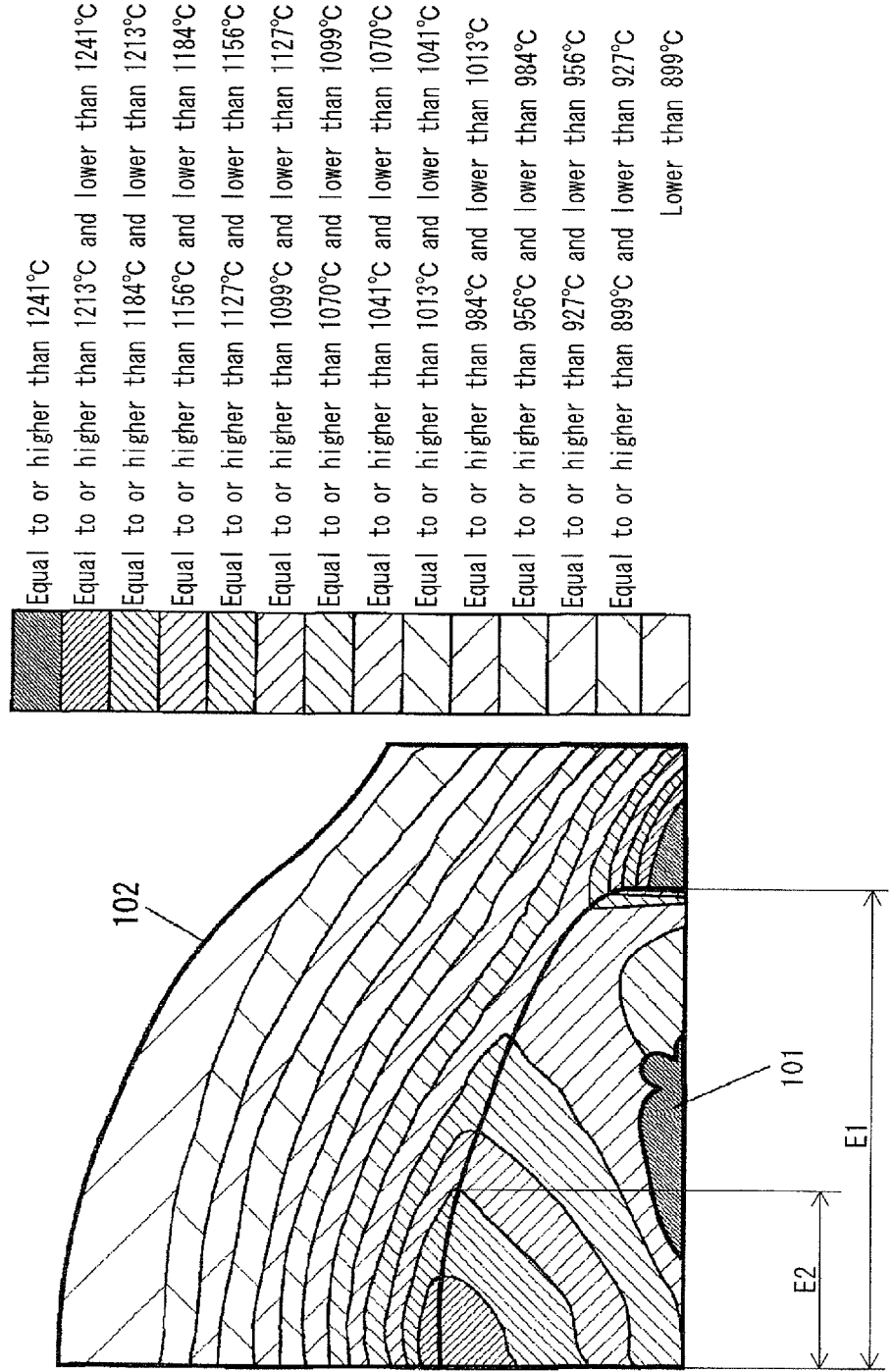
FIG. 7 shows temperature distribution of light-emitting part of an arc tube of Sample 4.
Figure 8:
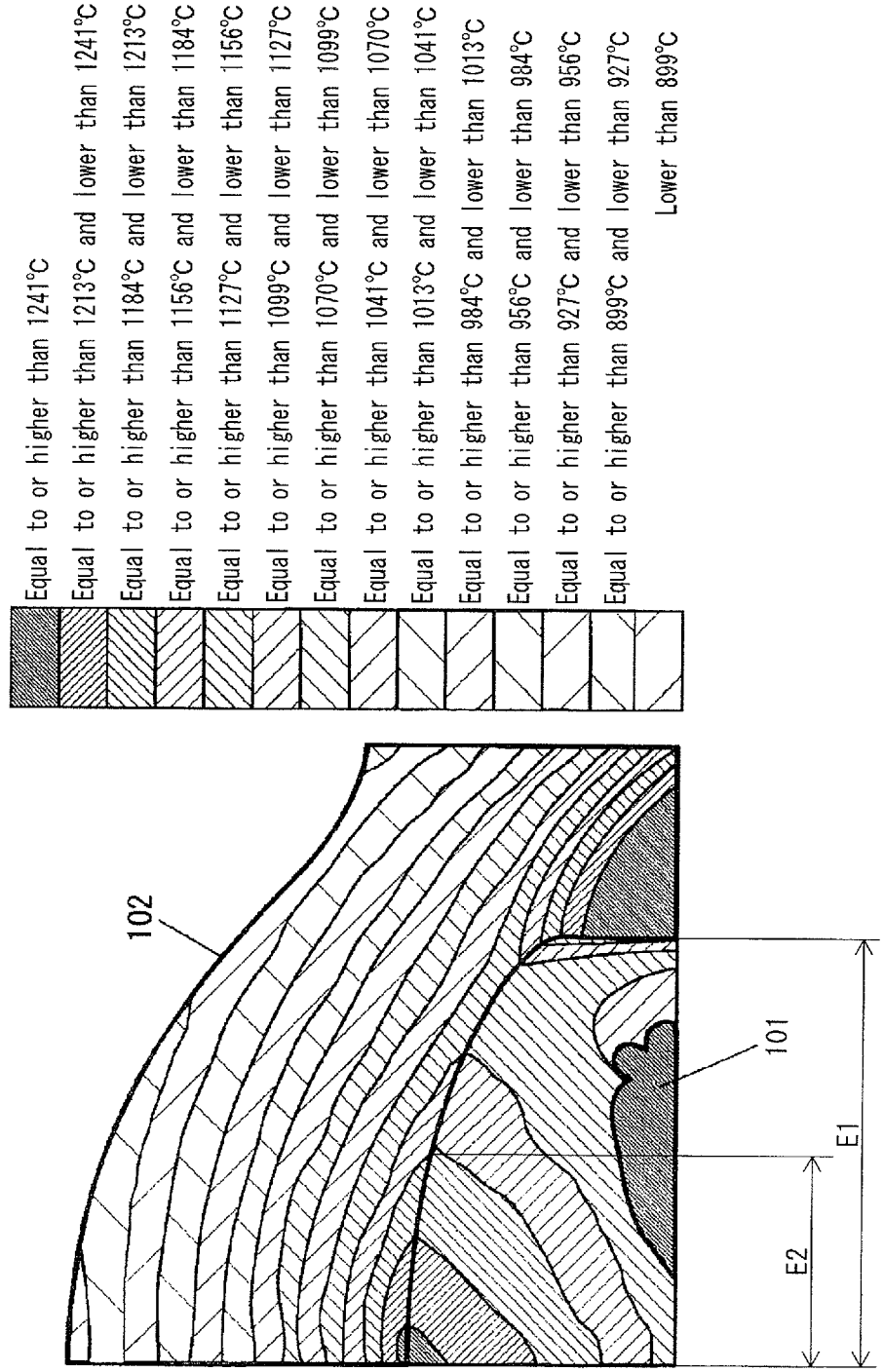
FIG. 8 shows temperature distribution of light-emitting part of an arc tube of Sample 5.
Figure 9:
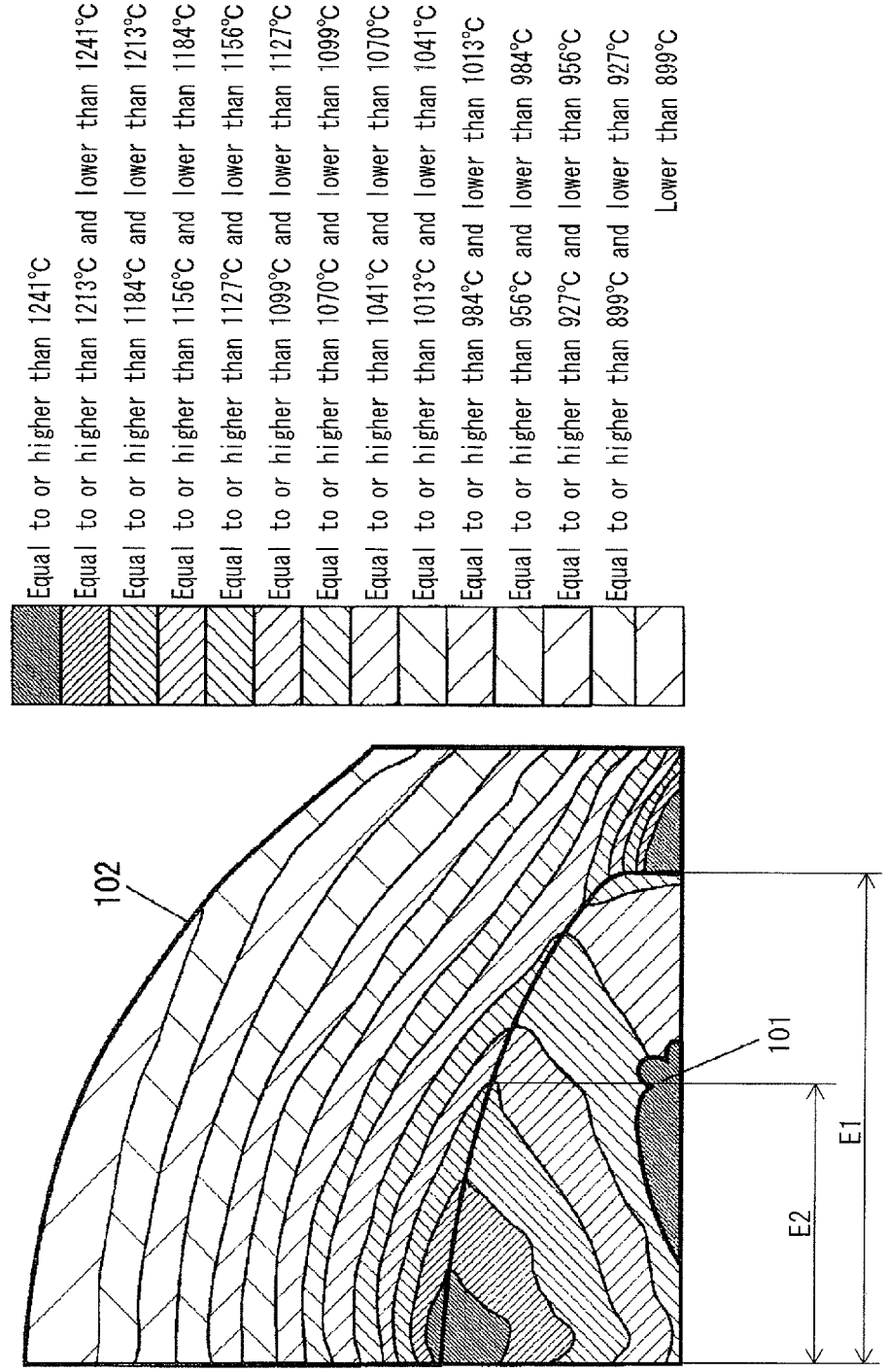
FIG. 9 shows temperature distribution of light-emitting part of an arc tube of Sample 6.
Figure 10:
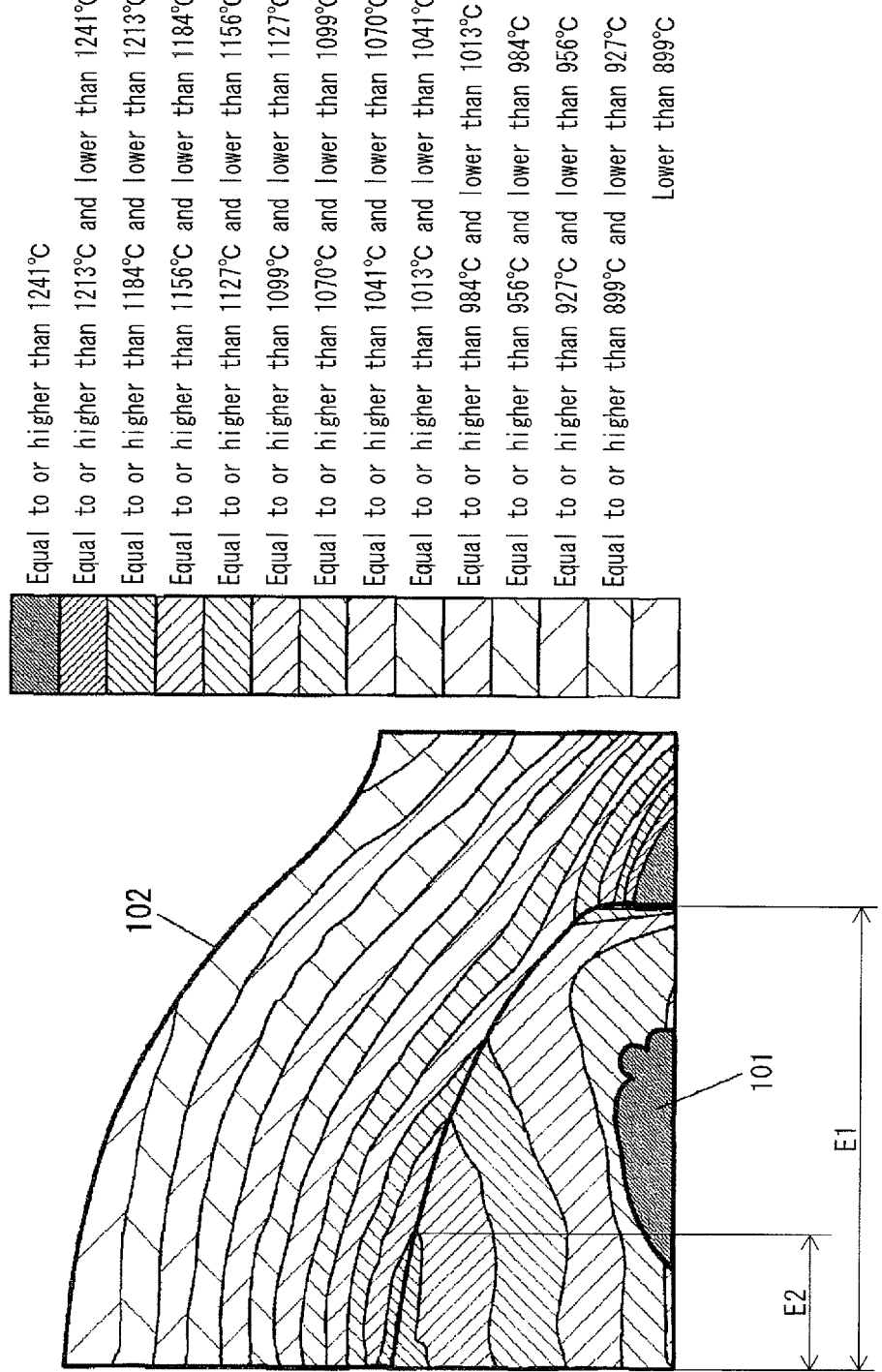
FIG. 10 shows temperature distribution of light-emitting part of an arc tube of Sample 7.
Figure 11:
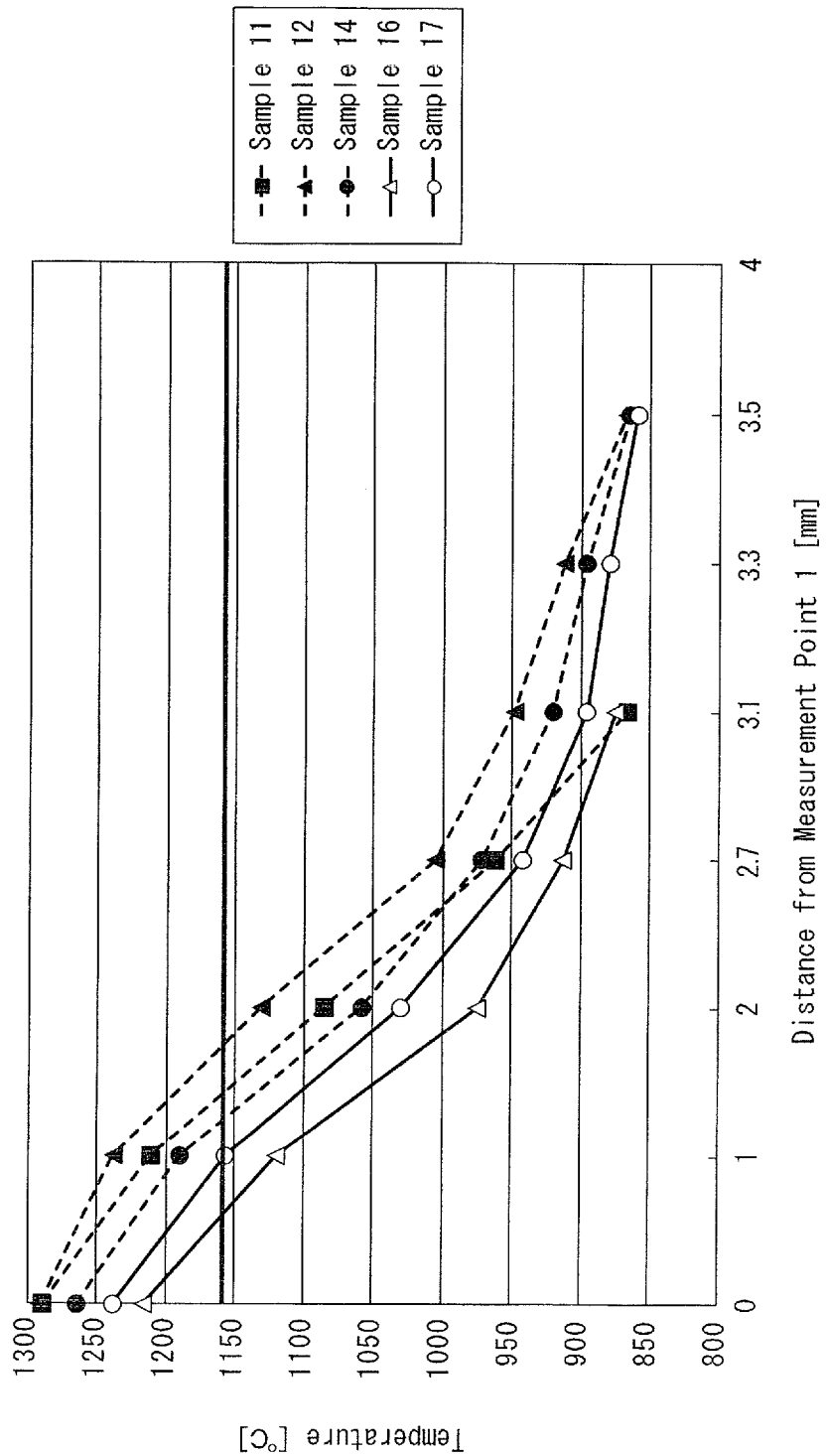
FIG. 11 shows relationships between a distance from the measurement point 1 and a temperature at the point in the case of lamps with a power rating of 380 W.
Figure 12:
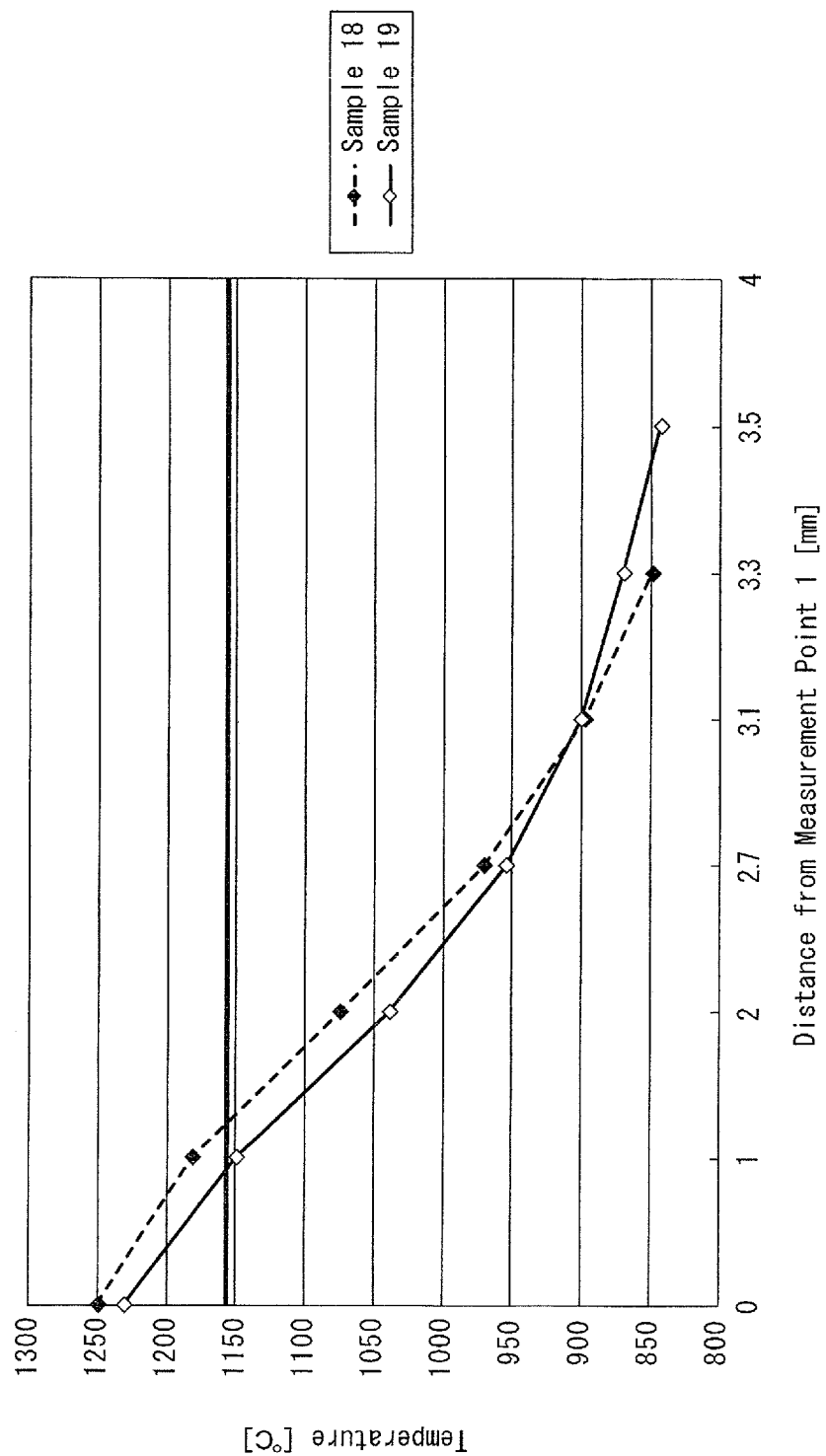
FIG. 12 shows relationships between a distance from the measurement point 1 and a temperature at the point in the case of lamps with a power rating of 400 W.
Figure 13:
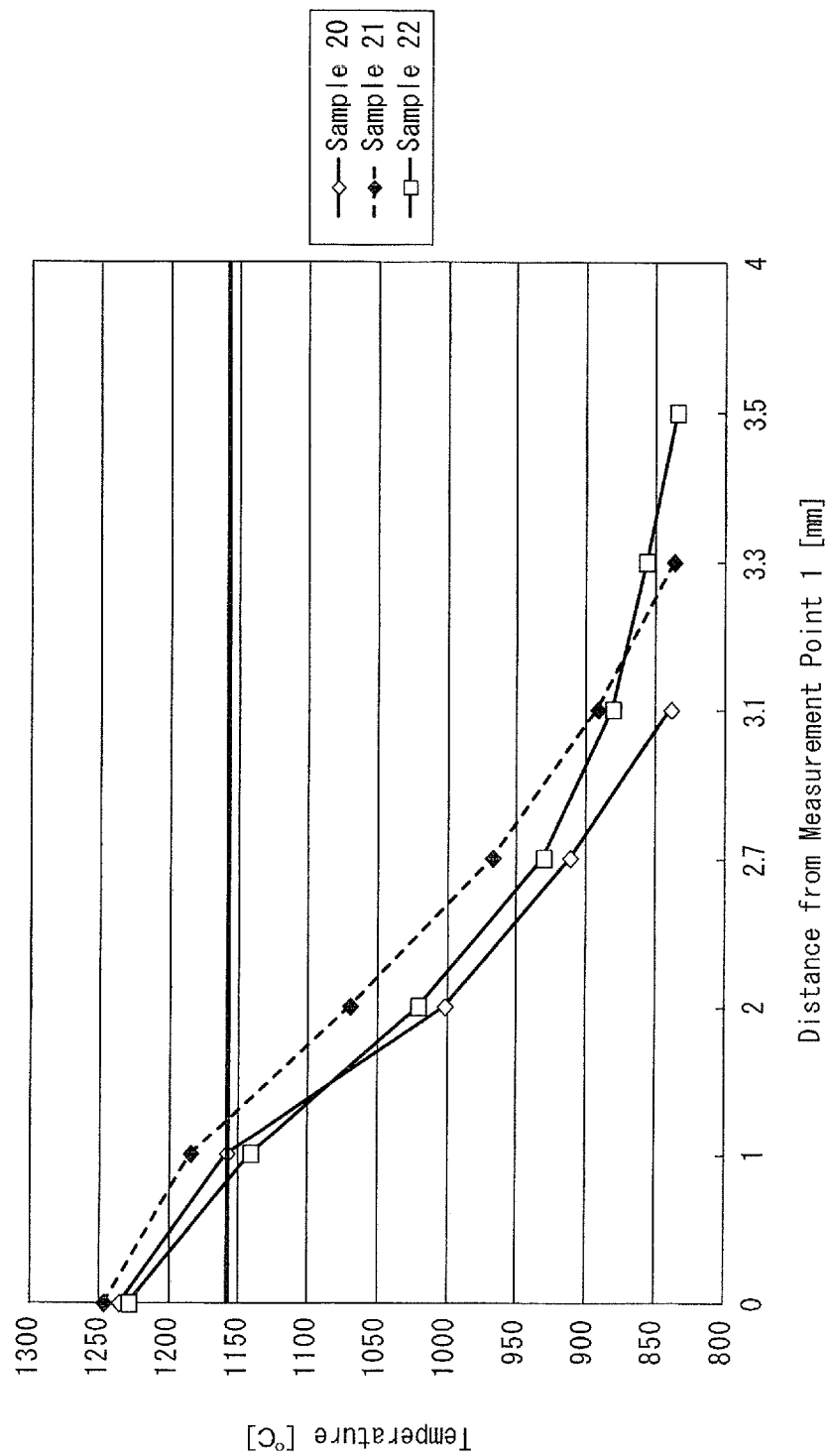
FIG. 13 shows relationships between a distance from the measurement point 1 and a temperature at the point in the case of lamps with a power rating of 450 W.
Figure 14:
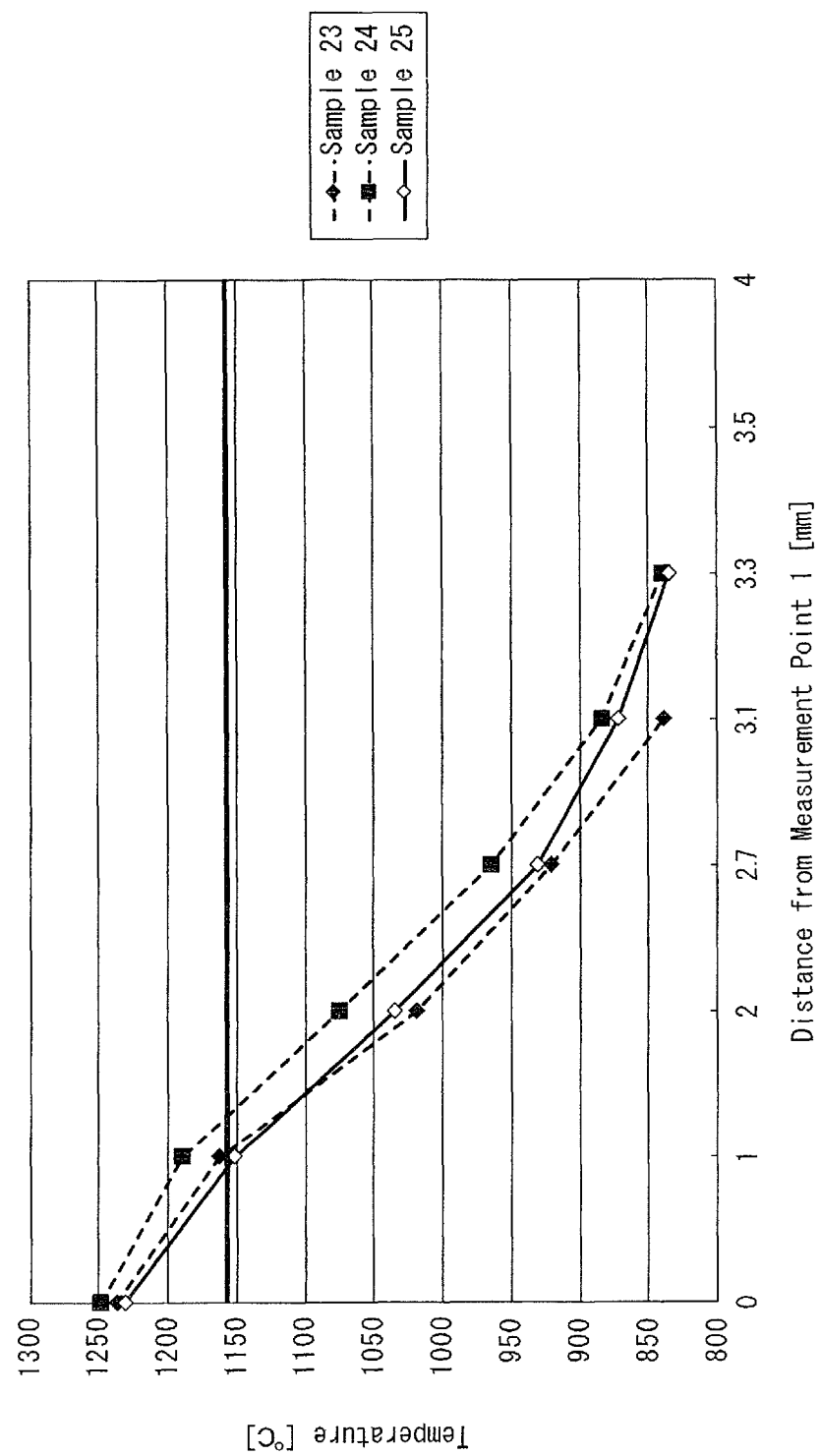
FIG. 14 shows relationships between a distance from the measurement point 1 and a temperature at the point in the case of lamps with a power rating of 500 W.
Figure 15:
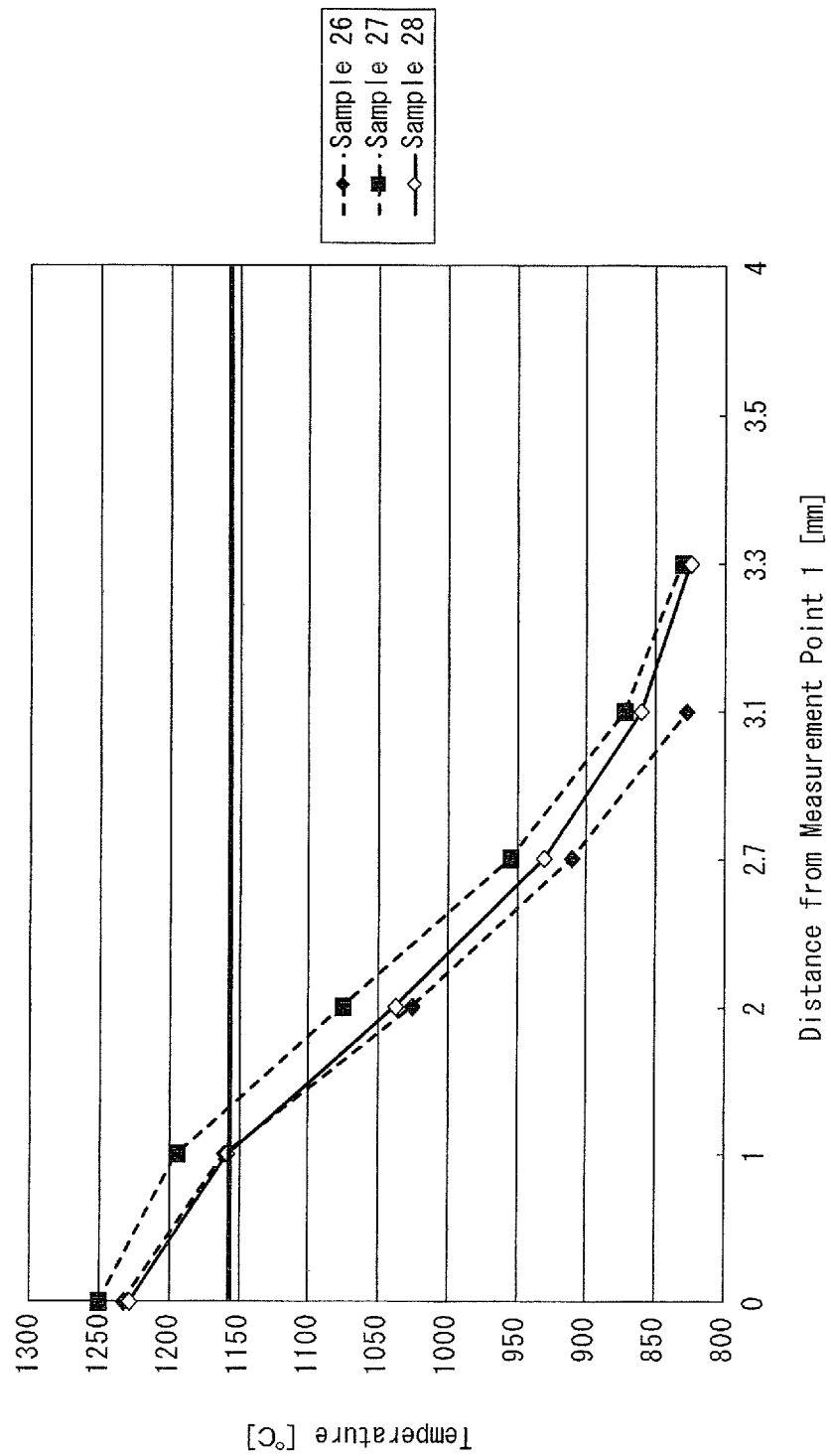
FIG. 15 shows relationships between a distance from the measurement point 1 and a temperature at the point in the case of lamps with a power rating of 600 W.

Subsequently, in order to find the reason why the temperature at Measurement Point 2 has an influence on loss of transparency of the light-emitting part, the inventors examined the temperatures distribution of the light-emitting part of the arc tube for each sample. As examples, FIG. 4 shows the temperature distribution in the light-emitting part of the arc tube of Sample 1, FIG. 5 shows the temperature distribution in the light-emitting part of the arc tube of Sample 2, FIG. 6 shows the temperature distribution in the light-emitting part of the arc tube of Sample 3, FIG. 7 shows the temperature distribution in the light-emitting part of the arc tube of Sample 4, FIG. 8 shows the temperature distribution in the light-emitting part of the arc tube of Sample 5, FIG. 9 shows the temperature distribution in the light-emitting part of the arc tube of Sample 6, and FIG. 10 shows the temperature distribution in the light-emitting part of the arc tube of Sample 7.

As shown in FIGS. 4 through 10, within the proximity of the internal surface of the light-emitting part, the area having a temperature no lower than 1184° C. (this area will be described later) is larger in Samples 1, 2, 3 and 6 than in Samples 4, 5 and 7. Note that the results of Samples 8 and 9 are similar to Samples 4, 5, and 7, That is, the inventors found that in the samples in which the temperature at Measurement Point 2 is equal to or higher than 1160° C. according to the results of the simulation test, the size of the area having a temperature no lower than 1184° C. is large according to the measurement results of the temperature distribution of the light-emitting part of the arc tube (evaluated based on the ratio of length in the tube axis direction). This is because when the area on the internal surface of the light-emitting part where the temperature is 1184° C. or higher is large, silica glass is crystallized in a large area due to the high temperature, and loss of transparency affects the luminance of the lamp.

In FIGS. 4 through 10, when E1 denotes the length of the internal surface of the light-emitting part in the tube axis direction and E2 denotes the length of the part of the internal surface in which the temperature is 1184° C. or higher in the tube axis direction, the ratio of E1 to E2 (i.e. E2/E1) was obtained. The results were: 71% for Sample 1; 69% for Sample 2; 73% for Sample 3; 38% for Sample 4; 50% for Sample 5; 58% for Sample 6; and 31% for Sample 7.

These results show that the light-emitting part is unlikely to lose its transparency when E2/E1 is less than 58%, and furthermore, the light-emitting part does not lose its transparency when E2/E1 is equal to or less than 50%.

Thus, based on the measurement results of the temperature distribution of the light-emitting part of the arc tube, the inventors confirmed the relationship acquired as a result of the simulation test between the temperature of the light-emitting part of the arc tube and the loss of transparency of the light-emitting part of the arc tube occurring at an early stage.

Test 2

The inventors checked whether or not breakage had occurred at an early stage of the arc tube by lighting each lamp sample under the following conditions:

the longitudinal direction of the lamp is substantially horizontal; the lighting power is 360 W, the lighting duration time is 5 h, the temperature at a point on the upper-side external surface of the light-emitting part of the arc tube is 860° C., the point corresponding in position to the midpoint between the pair of electrodes; and the temperature at a point on the lower-side external surface of the light-emitting part of the arc tube is 780° C., the point corresponding in position to the midpoint between the pair of electrodes. The temperatures were set by cooling the lamp by using a fan in the direction substantially perpendicular to the lamp axis as well as in the horizontal direction, under that condition where the lamp axis is horizontal.

Since each sample is a high-pressure discharge lamp, the arc tube bursts when breakage occurs. Hence, the occurrence of breakage can be easily checked visually. In the test, twenty lamps were prepared per each sample, and the number of lamps in which the breakage occurred was counted.

Table 1 shows the results.

TABLE 1

| | Inside Diameter [mm] | Wall Thickness [mm] | Number of Lamps with Broken Arc Tubes |
|---|---|---|---|
| Sample 1 | 5.0 | 2.7 | 7/20 |
| Sample 2 | 5.0 | 3.1 | 0/20 |
| Sample 3 | 5.0 | 3.5 | 0/20 |
| Sample 4 | 5.4 | 2.7 | 6/20 |
| Sample 5 | 5.4 | 3.1 | 0/20 |
| Sample 6 | 5.4 | 3.5 | 0/20 |
| Sample 7 | 5.8 | 2.7 | 3/20 |
| Sample 8 | 5.8 | 3.1 | 0/20 |
| Sample 9 | 5.8 | 3.5 | 0/20 |

As shown in Table 1, arc tube breakage occurred in some lamps belonging to Samples 1, 4 and 7. Lamps belonging to Samples 1, 4 and 7 are lamps whose arc tube has the wall thickness of 2.7 mm with reference to the midpoint between the pair of electrodes. The breakage occurred because the wall thickness of the arc tubes is too small, and the arc tubes could not withstand the internal pressure during lighting. In particular, when the wall thickness is smaller, it is more likely that a thin part locally exists due to variations of the wall thickness, the thin part being a part having a smaller thickness than the remaining part. The arc tube is likely to break due to the thin part.

In contrast, arc tube breakage did not occur in the lamps belonging to Samples 2, 3, 5, 6, 8 and 9. This is believed to be because the wall thickness of their arc tubes is large enough to withstand the internal pressure during lighting. In other words, breakage of the arc tube 102 can be prevented from occurring at an early stage by setting the wall thickness of the arc tube with reference to the midpoint between the pair of electrodes to be equal to or larger than 3.1 mm.

Thus, by Tests 1 and 2, the inventors confirmed that in the cases of lamps with a power rating of 360 W, the numerical range satisfying Relational Expression 1 can prevent breakage and loss of transparency of the light-emitting part of the arc tube from occurring at an early stage.

Test 3

Tests 1 and 2 described above were conducted on lamps with a power rating of 360 W. A simulation test was conducted also on lamps with a power rating of 380 W, 400 W, 450 W, 500 W and 600 W. FIGS. 11 through 15 show the results, and FIG. 16 shows the specifications (i.e. inside diameters and wall thicknesses) of all these lamps.

From the results, it can be confirmed that, when Relational Expression 1 is satisfied, loss of transparency of the light-emitting part of the arc tube is prevented from occurring at an early stage even in the cases of the lamps other than lamps with a power rating of 360 W, namely in the cases of lamps with a power rating of 380 W to 600 W.

Similarly to the case of the lamps with a power rating of 360 W on which Test 2 was conducted, breakage of the arc tube 102 is prevented from occurring at an early stage even in the cases of lamps with a power rating within the stated range when the wall thickness of the arc tube with reference to the midpoint of the pair of electrodes is equal to or larger than 3.1 mm, since such an arc tube can withstand the internal pressure during lighting.

As described above, the structure of the high-pressure discharge lamp 100 pertaining to Embodiment 1 of the present invention prevents breakage and loss of transparency of the light-emitting part 102 of the arc tube 104 from occurring at an early stage.

Embodiment 2

Figure 17A:
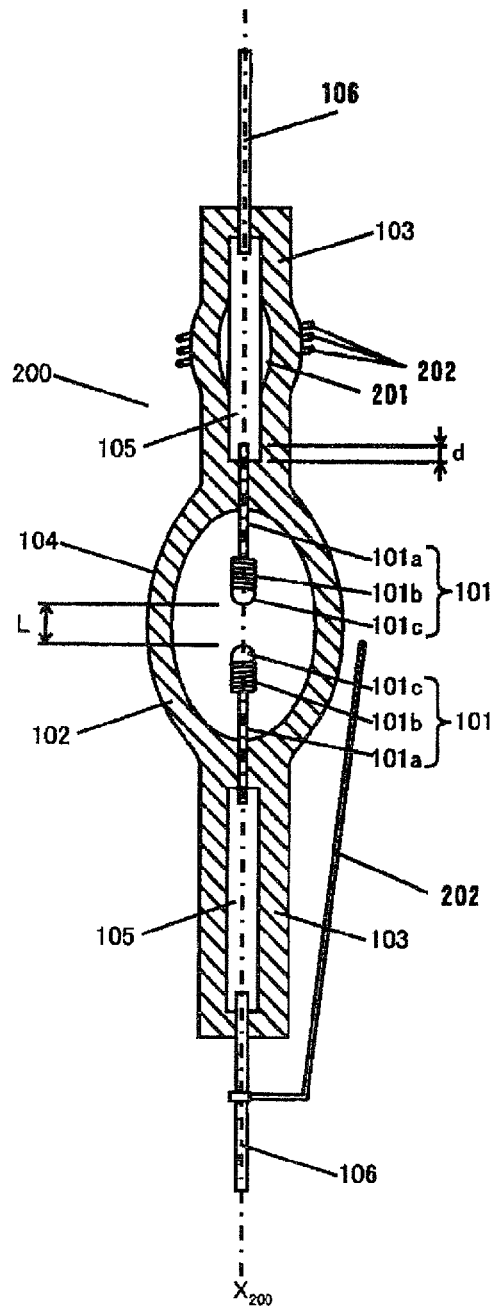
FIG. 17A is a frontal cross-sectional view of a high-pressure discharge lamp pertaining to Embodiment 2 of the present invention, including a tube axis of the lamp.
Figure 17B:
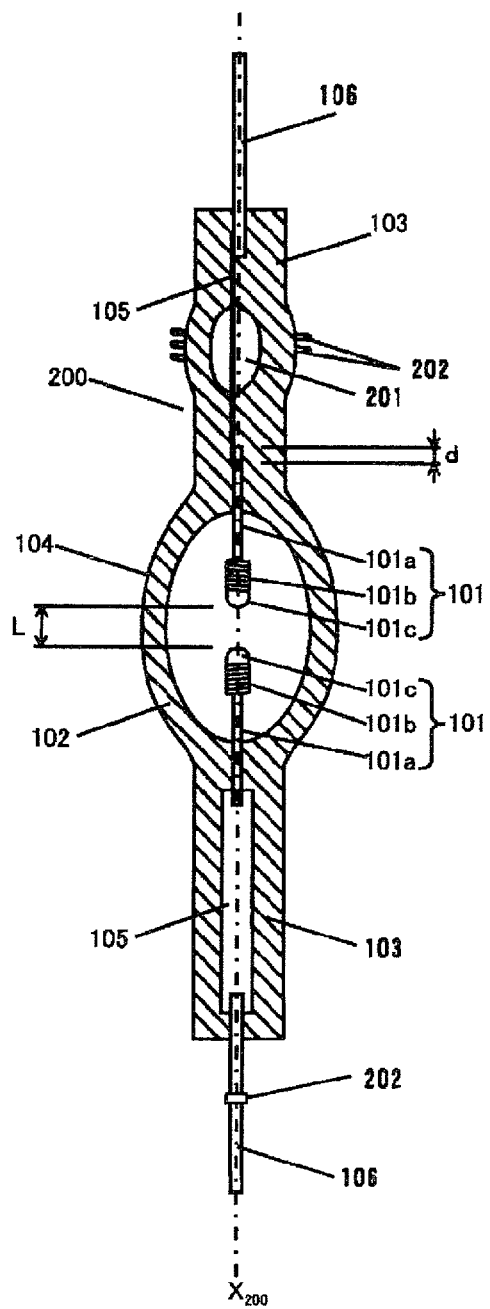
FIG. 17B is a left-side cross-sectional view of the same lamp, including the tube axis.

FIGS. 17A and 17B respectively show a frontal cross-sectional view of a high-pressure discharge lamp pertaining to Embodiment 2 of the present invention, including a tube axis of the lamp, and a right-side cross-sectional view thereof. The high-pressure discharge lamp pertaining to Embodiment 2 of the present invention (hereinafter referred to as "high-pressure discharge lamp 200") has substantially the same structure as the high-pressure discharge lamp 100 except that a cavity 201 is formed in at least one of the sealing parts 103 and an antenna 202 is provided outside the cavity 201. Therefore, the following only describes the cavity 201 and the antenna 202 in details, and descriptions of other features are omitted. Note that the electrodes 101, the metal foils 105 and the lead wires 106 in FIG. 17A, and the electrodes 101 and the lead wires 106 in FIG. 17B are depicted without being cut, for the sake of convenience.

The cavity 201 is formed at least in one of the sealing parts 103. The cavity 201 encloses at least a rare gas. The cavity 201 may enclose the same as the light-emitting part 102 (e.g. rare gas and mercury). Also, barium oxide or thoriated tungsten may be disposed in the cavity 201. If this is the case, it is easy to cause discharge between the metal foil 105 and the antenna 202 since barium oxide and thoriated tungsten is likely to emit electrons.

The external surface of the sealing part 103 in which the cavity 201 is formed is provided with the antenna 102. The antenna 202 is made of an iron-chromium alloy, for example. One end thereof is wound around the sealing part three times, and the other end is connected to the lead wire 106. The antenna 202 is not necessarily made of an iron-chromium alloy, and may be made from a metal wire of molybdenum, tungsten, or the like.

Note that a second antenna (not depicted) serving as a trigger wire may be provided on one end of the sealing part 103 closer to the light-emitting part 102 (approximately on the outer surface of the portion of the sealing part 103 where the electrode rod 101a is embedded in the sealing part 103).

As described above, the structure of the high-pressure discharge lamp 200 pertaining to Embodiment 2 of the present invention prevents breakage and loss of transparency of the light-emitting part 102 of the arc tube 104 from occurring at an early stage. Moreover, with the cavity 201 and the antennas 202, the arc tube easily starts discharge.

Embodiment 3

Figure 18:
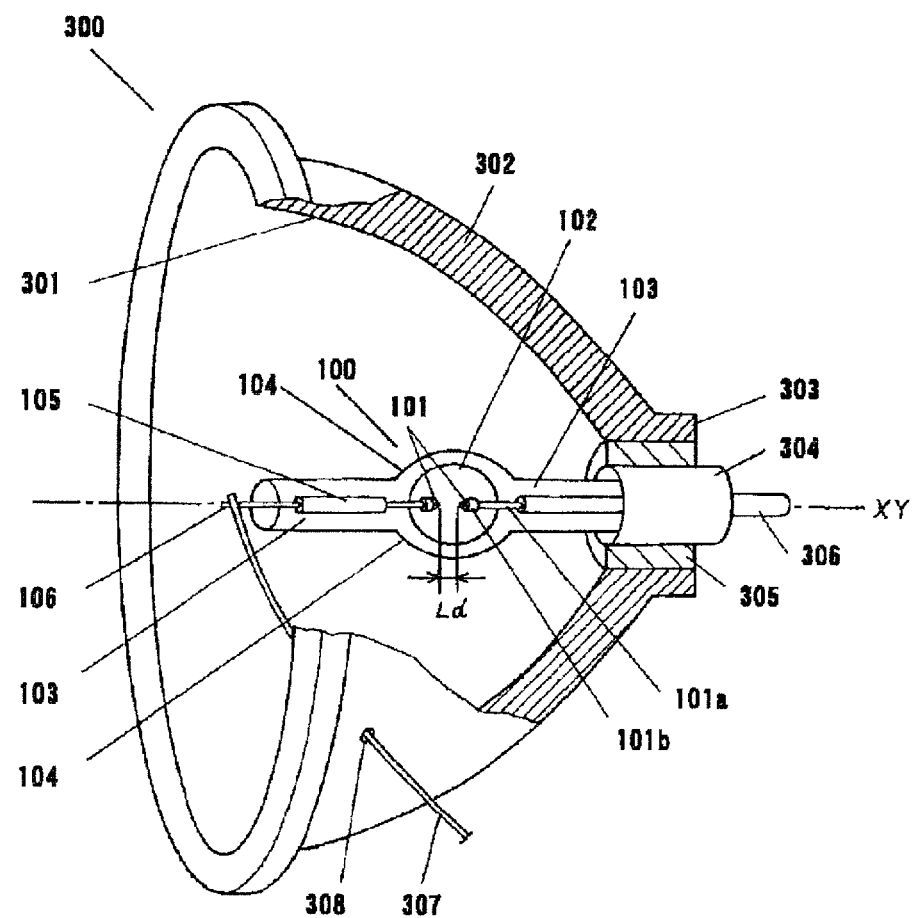
FIG. 18 is a partially cut-away perspective view of a lamp unit pertaining to Embodiment 3 of the present invention.

FIG. 18 is a partially cut-away perspective view of a lamp unit pertaining to Embodiment 3 of the present invention. As shown in FIG. 18, the lamp unit pertaining to Embodiment 3 of the present invention (hereinafter referred to as "lamp unit 300") includes the high-pressure discharge lamp 100 and a reflection mirror 302 having a concave reflection surface 301. The high-pressure discharge lamp 100 is built in the reflection mirror 302 so that light emitted from the high-pressure discharge lamp 100 is reflected off the reflection surface 301.

The concave reflection surface 301 is formed inside the reflection mirror 302, and the reflection surface 301 reflects light from the high-pressure discharge lamp 100. To increase the light collection efficiency of the reflection mirror 302 collecting light from the high-pressure discharge lamp 100, the reflection mirror 302 is combined with the high-pressure discharge lamp 100 so that the central axis of the high-pressure discharge lamp 100 in the longitudinal direction substantially coincides with the optical axis Y of the reflection mirror 302. The reflection surface 301 is formed from a spheroid, or paraboloid of revolution. Although a mirror having a reflection surface on which a multilayered interference film is deposited is commonly used, the present invention is not limited to this.

One of the sealing parts 103 that is closer to a neck part 303 of the reflection mirror 302 than the other is inserted into a base 304, and is thus fixed to the reflection mirror 302. The base 304 is cylindrical, for example, and is fixed to the reflection mirror 302 with an adhesive material 305 or the like. Also, the base 304 is attached with a terminal 306 for connection with a power source.

In the high-pressure discharge lamp 100, one of the lead wires 106 that is farther from the base 304 than the other is connected to a power supply line 307. The power supply line 307 is passed through a through hole 308 provided in the reflection mirror 302.

Although the high-pressure discharge lamp 100 is used in FIG. 18, the high-pressure discharge lamp 200 may be used instead.

As described above, the structure of the lamp unit 300 pertaining to Embodiment 3 of the present invention uses the high-pressure discharge lamp 100 or 200 which prevents breakage and loss of transparency of the light-emitting part 102 of the arc tube 104 from occurring at an early stage, and thereby improves the reliability in regards to the life-span.

Embodiment 4

Figure 19:
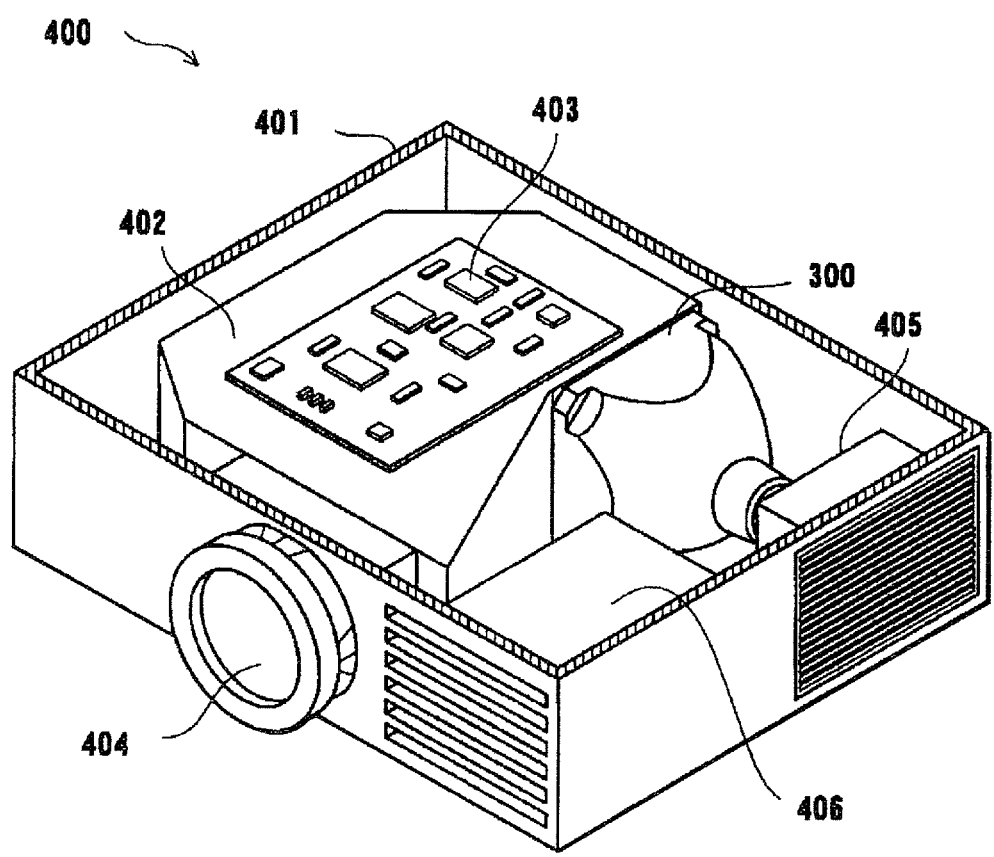
FIG. 19 is a perspective view of a projector-type image display apparatus pertaining to Embodiment 4 of the present invention.

FIG. 19 is a perspective view of a projector-type image display apparatus pertaining to Embodiment 4 of the present invention. The projector-type image display apparatus pertaining to Embodiment 4 of the present invention (hereinafter referred to as "image display apparatus 400") is a projector that projects images on a screen (not depicted) disposed in front thereof.

The projector-type image display apparatus 400 includes: the lamp unit 300; an optical unit 402 for forming optical images by modulating light from the lamp unit 300; and a projector device 404 for magnifying and projecting optical images.

More specifically, the projector-type image display apparatus 400 includes: a chassis 401; the lamp unit 300 housed in the chassis 401; the optical unit 402; a control unit 406; the projector device 404; a cooling fan unit 405; and a power source unit 403.

The power source unit 403 includes a DC power circuit and a high-pressure discharge lamp lighting device (neither of them is depicted), and converts power supplied from a commercial power source and supplies appropriate power to the control unit 406, the lamp unit 300 and the cooling fan unit 405. In FIG. 19, the top part of the chassis 401 is removed in order to improve visibility of the structure of the projector-type image display apparatus 400.

As described above, the structure of the projector-type image display apparatus 400 pertaining to Embodiment 4 of the present invention uses the high-pressure discharge lamp 100 or 200 which prevents breakage and loss of transparency of the light-emitting part 102 of the arc tube 104 from occurring at an early stage, and thereby improves the reliability in regards to the life-span.

Embodiment 5

Figure 20:
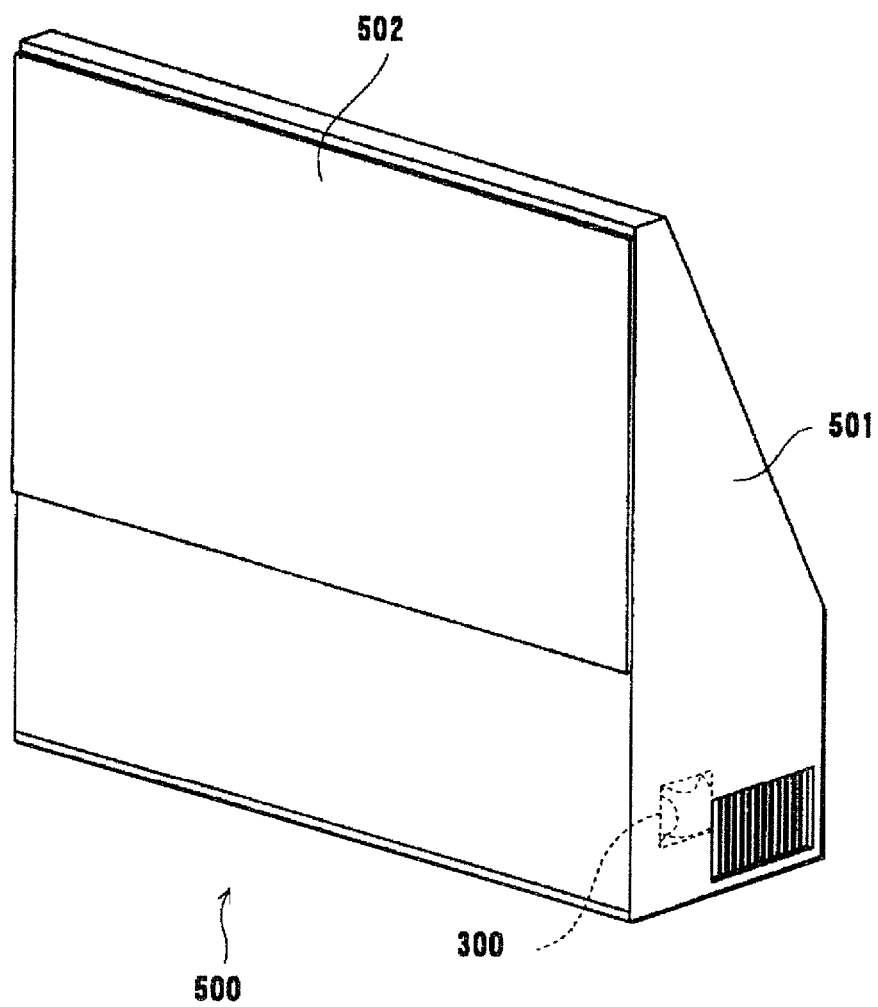
FIG. 20 is a perspective view of a projector-type image display apparatus pertaining to Embodiment 5 of the present invention.

FIG. 20 is a perspective view of a projector-type image display apparatus pertaining to Embodiment 5 of the present invention. The projector-type image display apparatus pertaining to Embodiment 5 of the present invention (hereinafter referred to as "image display apparatus 500") is a rear projector, and includes: the lamp unit 300 with a built-in high-pressure discharge lamp; and a chassis 501 in which an optical unit, a projector device and a mirror (none of them is depicted) are housed for example.

In the image display apparatus 500, images emitted through a projection lens (not depicted) and reflected by a mirror (not depicted) is projected from the rear side of a translucent screen 502 fit in an opening of the chassis 501, and thus images are displayed.

As described above, the structure of the projector-type image display apparatus 500 pertaining to Embodiment 5 of the present invention uses the high-pressure discharge lamp 100 or 200 which prevents breakage and loss of transparency of the light-emitting part 102 of the arc tube 104 occurring at an early stage, and thereby improves the reliability in regards to the life-span.

<Modifications>

The present invention has been described above based on specific examples as Embodiments. However, as a matter of course, the present invention is not limited to Embodiments, and is applicable to various electrodes for discharge lamps, manufacturing methods of electrodes for discharge lamps, high-pressure discharge lamps, lamp units, and projector-type image display apparatuses.

INDUSTRIAL APPLICABILITY

The present invention is widely applicable to high-pressure discharge lamps, lamp units and projector-type image display apparatuses.

REFERENCE SIGNS LIST 100, 200: High-pressure discharge lamp
101: Electrode
102: Light-emitting part
103: Sealing part
104: Arc tube
300: Lamp unit
301: Reflection surface
302: Reflection mirror
400, 500: Projector-type image display apparatus
401: Chassis
402: Optical unit

The invention claimed is:

1. A high-pressure discharge lamp comprising an arc tube, the arc tube including:
 a light-emitting part which is substantially ellipsoidal, which encloses a predetermined amount of mercury, and in which a pair of electrodes are disposed so that heads of the electrodes face each other; and
 sealing parts which extend from either end of the light-emitting part and in which bases of the electrodes are sealed,
 the high-pressure discharge lamp having a power rating greater than 355 W and not greater than 600 W,
 the predetermined amount falling within a range of 0.3 mg/mm$^3$ to 0.4 mg/mm$^3$, wherein
 $5.4 \leq D \leq 5.8$ and $3.1 \leq X \leq D-2.3$ when $355 < P \leq 380$,
 $5.8 \leq D \leq 6.2$ and $3.1 \leq X \leq D-2.7$ when $380 < P \leq 450$, and
 $6.2 \leq D \leq 6.6$ and $3.1 \leq X \leq D-3.3$ when $450 < P \leq 600$,
 where P denotes the power rating in watts of the high-pressure discharge lamp, D denotes an inside diameter in millimeters of the light-emitting part with reference to a midpoint between the electrodes, and X denotes a wall thickness in millimeters of the light-emitting part with reference to the midpoint between the electrodes.

2. A lamp unit comprising:
 the high-pressure discharge lamp defined in claim 1; and
 a reflection mirror which has a concave reflection surface and in which the high-pressure discharge lamp is disposed so that light emitted by the high-pressure discharge lamp is reflected by the concave reflection surface.

3. A projector-type image display apparatus comprising:
the lamp unit defined in claim 2;
an optical unit configured to modulate light emitted by the lamp unit and to thereby form an optical image; and
a projector device configured to magnify and project the optical image.

* * * * *